United States Patent
Graf et al.

(10) Patent No.: US 10,909,268 B2
(45) Date of Patent: *Feb. 2, 2021

(54) PROXIMITY-BASED USER AUTHENTICATION FOR PROVIDING A WEBPAGE OF AN ACCESS-CONTROLLED APPLICATION

(71) Applicant: FISERV, INC., Brookfield, WI (US)

(72) Inventors: Scott Graf, Decatur, GA (US); Christopher David Landry, Suwanee, GA (US); Dennis Yinhaw Wang, Pittsburgh, PA (US)

(73) Assignee: FISERV, INC., Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,057

(22) Filed: Mar. 11, 2020

(65) Prior Publication Data
US 2020/0210604 A1    Jul. 2, 2020

Related U.S. Application Data

(63) Continuation of application No. 15/966,628, filed on Apr. 30, 2018, now Pat. No. 10,657,289.

(51) Int. Cl.
*H04L 29/06* (2006.01)
*G06F 21/62* (2013.01)
(Continued)

(52) U.S. Cl.
CPC ........... *G06F 21/629* (2013.01); *G06F 16/95* (2019.01); *H04L 9/3213* (2013.01);
(Continued)

(58) Field of Classification Search
CPC ......... G06F 2221/2111; H04L 63/0853; H04L 63/0876; H04L 63/107; H04L 67/14; H04L 9/3213; H04W 4/80
See application file for complete search history.

(56) References Cited

U.S. PATENT DOCUMENTS

2016/0226883 A1* 8/2016 Kusens ............... G06Q 30/0207
2019/0014107 A1* 1/2019 George ................ H04L 67/146

OTHER PUBLICATIONS

U.S. Appl. No. 15/966,628, filed Apr. 30, 2018, 2019-0332787, Allowed.

(Continued)

*Primary Examiner* — Olugbenga O Idowu
(74) *Attorney, Agent, or Firm* — Alston & Bird LLP

(57) ABSTRACT

Example embodiments relate to controlling secured access to electronically provided application functionality or content. An Internet browser executing on a first computing device initiates periodic polling of a paired second computing device associated with a user for measurements of short range communication protocol signal strength of the second computing device and determines that the second computing device is within an authentication distance of the first computing device. The secure Internet browser transmits an authentication request comprising a device identifier of the second computing device. Responsive to transmitting the authentication request, the secure Internet browser receives an authentication response indicating authentication confirmation, and responsive thereto, the secure Internet browser provides access to a controlled-access application by transmitting a request to a content server for a presentation of the controlled-access application, receiving from the content server a presentation associated with the user, and directing display of the presentation via a user interface.

24 Claims, 9 Drawing Sheets

(51) Int. Cl.
  *H04L 29/08* (2006.01)
  *H04L 9/32* (2006.01)
  *G06F 16/95* (2019.01)
  *H04W 4/80* (2018.01)
(52) U.S. Cl.
  CPC ...... *H04L 63/0853* (2013.01); *H04L 63/0876* (2013.01); *H04L 63/107* (2013.01); *H04L 67/14* (2013.01); *G06F 2221/2111* (2013.01); *H04W 4/80* (2018.02)

(56) References Cited

OTHER PUBLICATIONS

Apple, "How to unlock your Mac with your Apple Watch", retrieved from <https://support.apple.com/en-us/HT206995> on Sep. 19, 2018, 3 pages.
Hoffman, Chris, "How to Unlock Your Computer with Your Phone or Watch", How-to-Geek, Jul. 24, 2015, retrieved from <https://www.howtogeek.com/222924/how-to-unlock-your-computer-with-your-phone-or-watch/> on Sep. 19, 2018, 10 pages.
Web Bluetooth Community Group, "Web Bluetooth, Draft Community Group Report", Aug. 20, 2018, retrieved from <https://webBluetoothcg.github.io/web-Bluetooth/> on Sep. 19, 2018, 102 pages.

* cited by examiner

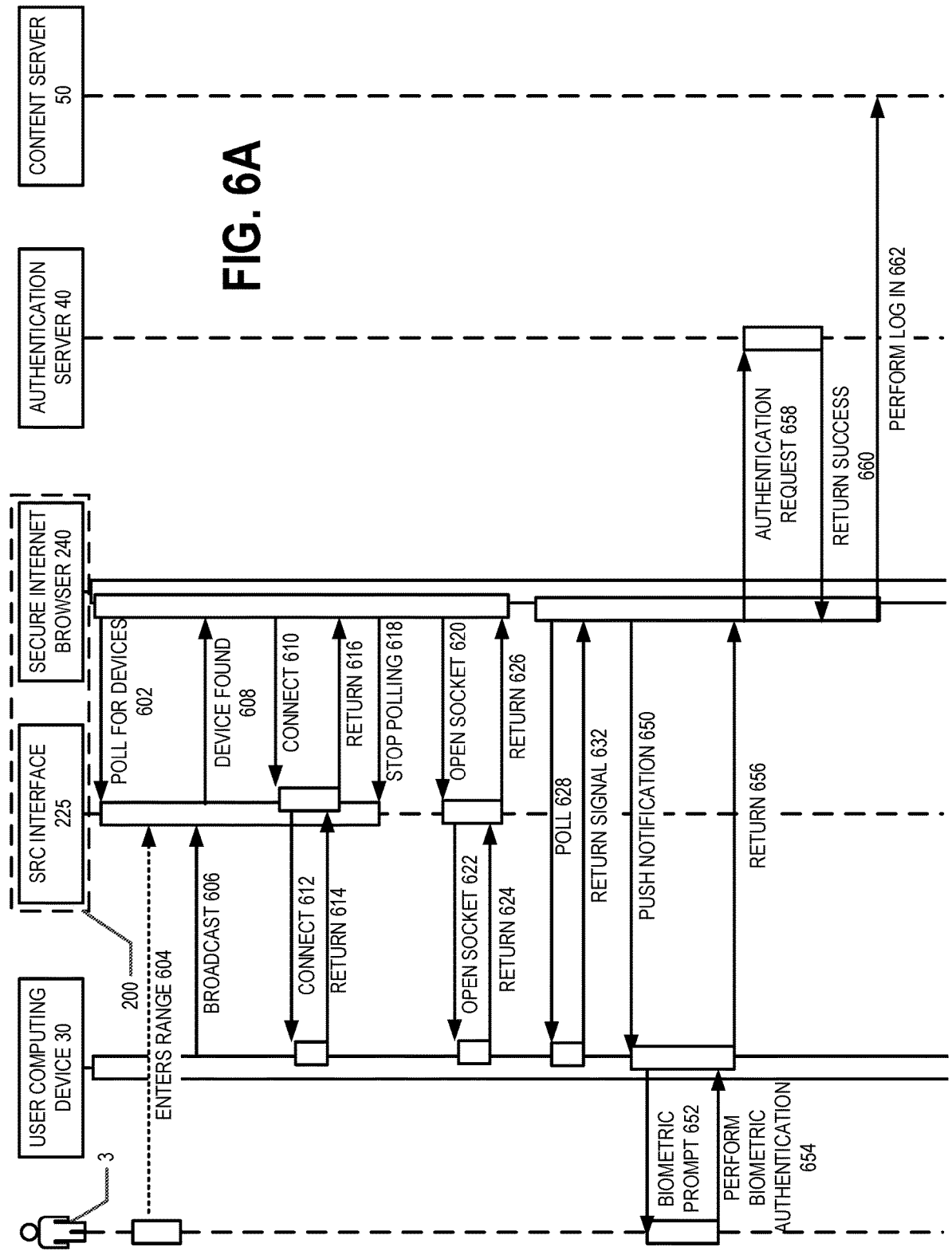

PROXIMITY-BASED USER AUTHENTICATION FOR PROVIDING A WEBPAGE OF AN ACCESS-CONTROLLED APPLICATION

CROSS-REFERENCE TO RELATED APPLICATIONS

This application is a continuation of U.S. application Ser. No. 15/966,628 filed Apr. 30, 2018, which is hereby incorporated by reference in its entirety.

FIELD

Various embodiments generally relate to user authentication. For example, an example embodiment relates to secure authentication of a user for allowing user access to a secure Internet browser-based function requiring user account credentials.

BACKGROUND

In various scenarios, a user may approach a computing device, such as a personal or work computer, a tablet, and/or the like, running a secure Internet browser, and be required to provide user credentials to access one or more functions through the secure Internet browser. User credentials may comprise one or more values identifying and authenticating the user, using any of a variety of authentication technologies and interaction flows. Traditional authentication approaches may be time-consuming or error-prone, may require the user to remember credentials, may be susceptible to insecure credentials management by the user, and/or may be susceptible to third-party interception or appropriation and potential subsequent unauthorized use.

BRIEF SUMMARY OF SOME EXAMPLE EMBODIMENTS

Various embodiments provide methods, apparatuses, computer program products, systems, and/or the like that provide improved user authentication. For example, various embodiments provide methods, apparatuses, computer program products, systems, and/or the like provide an improved technique for authenticating a user to allow the user to access (and/or provide the user with) one or more functions of a provided via a secure Internet browser. In an example embodiment, a secure Internet browser may be a program, application, and/or the like operating on a secure computing device that is configured to provide an interactive user interface that is secured (e.g., a user logs into the secure Internet browser to access any functions of the secure Internet browser). In various embodiments, one or more of the functions provided by the secure Internet browser may be provided via a secured connection with a content server.

In an example embodiment, a user may be authenticated based on the proximity of a user computing device to the secure computing device operating, executing, and/or providing the secure Internet browser. For example, the secure computing device may poll a zone or region around the secure computing device for a user computing device. In an example embodiment, the zone or region around the secure computing device may be defined by a distance and/or range that is within the communication and/or signal range of a short range communication (SRC) protocol used for interaction between the secure computing device and the user computing device. When the secure computing device identifies a user computing device within the distance or range around the secure computing device, the secure computing device (and/or the secure Internet browser operating, executing and/or provided by the secure computing device) may perform one or more authentication routines (e.g., confirming the identity of the user computing device and/or that of the user corresponding to the user computing device, requesting the user computing device to perform a biometric authentication, and/or the like), in an example embodiment. In an example embodiment, responsive to the identification and/or authentication of a user computing device within the distance or range around the secure computing device, the secure computing device may communicate with an authentication server and/or the like to authenticate the user, log the user in, and/or the like such that the user may access one or more functions of the secure Internet browser. In an example embodiment, the one or more functions of the secure computing device may comprise at least one of providing the user with access to the secure computing device (e.g., logging the user onto the secure computing device), providing the user with access to a secure Internet browser and/or interactive user interface via the secure computing device, providing a user with confidential information/data, for example via a secure Internet browser and/or user interface, via the secure computing device, performing one or more ATM functions, and/or the like. In an example embodiment, responsive to authenticating a user based on the identification, authentication, and/or detection of the user's computing device within the distance or range of the secure computing device, the secure Internet browser may provide a user with application functionality (e.g., one or more secured applications, programs, and/or the like and/or functions thereof), retrieval and display of particular content (e.g., confidential content and/or other content), in a secured environment. The functionality provided by the secure Internet browser may be personalized and/or customized for a user based on information/data, credentials, and/or preferences stored in the corresponding user profile.

According to various aspects of the present invention, methods, computing devices, computer program products, and systems are provided for controlling secured access to electronically provided application functionality or content. In an example embodiment, an Internet browser executing on a first computing device initiates periodic polling of a paired second computing device associated with a user for measurements of SRC protocol signal strength of the second computing device. The secure Internet browser determines that the second computing device is within an authentication distance of the first computing device. The second computing device is determined to be within the authentication distance of the first computing device when a first predetermined number of received measurements of SRC protocol signal strength of the second computing device is greater than or equal to a first predetermined threshold. The secure Internet browser transmits to an authentication server an authentication request comprising a device identifier of the second computing device. Responsive to transmitting the authentication request, the secure Internet browser receives, from the authentication server, an authentication response indicating authentication confirmation. Responsive to receiving the authentication response indicating authentication confirmation, the secure Internet browser provides access to a controlled-access application by: transmitting, by the secure Internet browser to an content server, a request for a presentation of the controlled-access application, receiving, by the secure Internet browser from the content server, a presentation associated with the user, and directing display of, by the secure Internet browser via a user interface of the first computing device, the presentation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
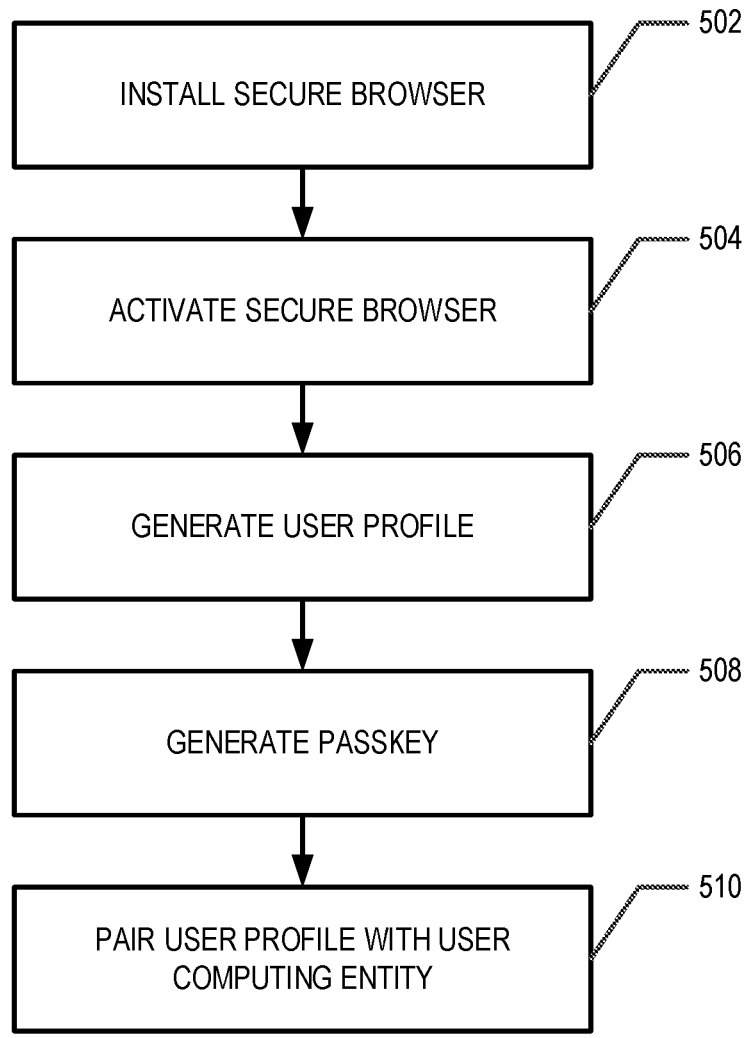
Figure 6:
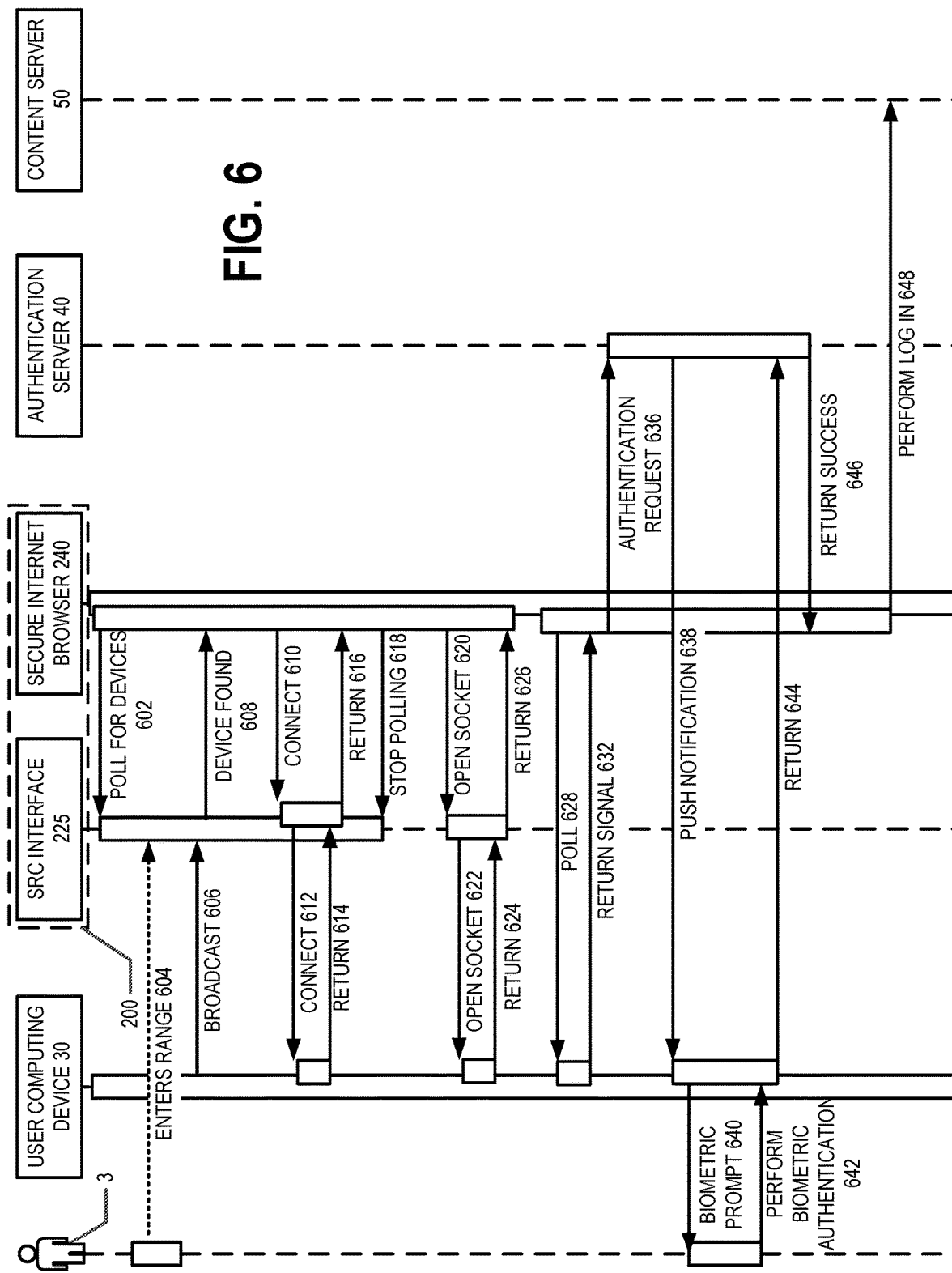
Figure 7:
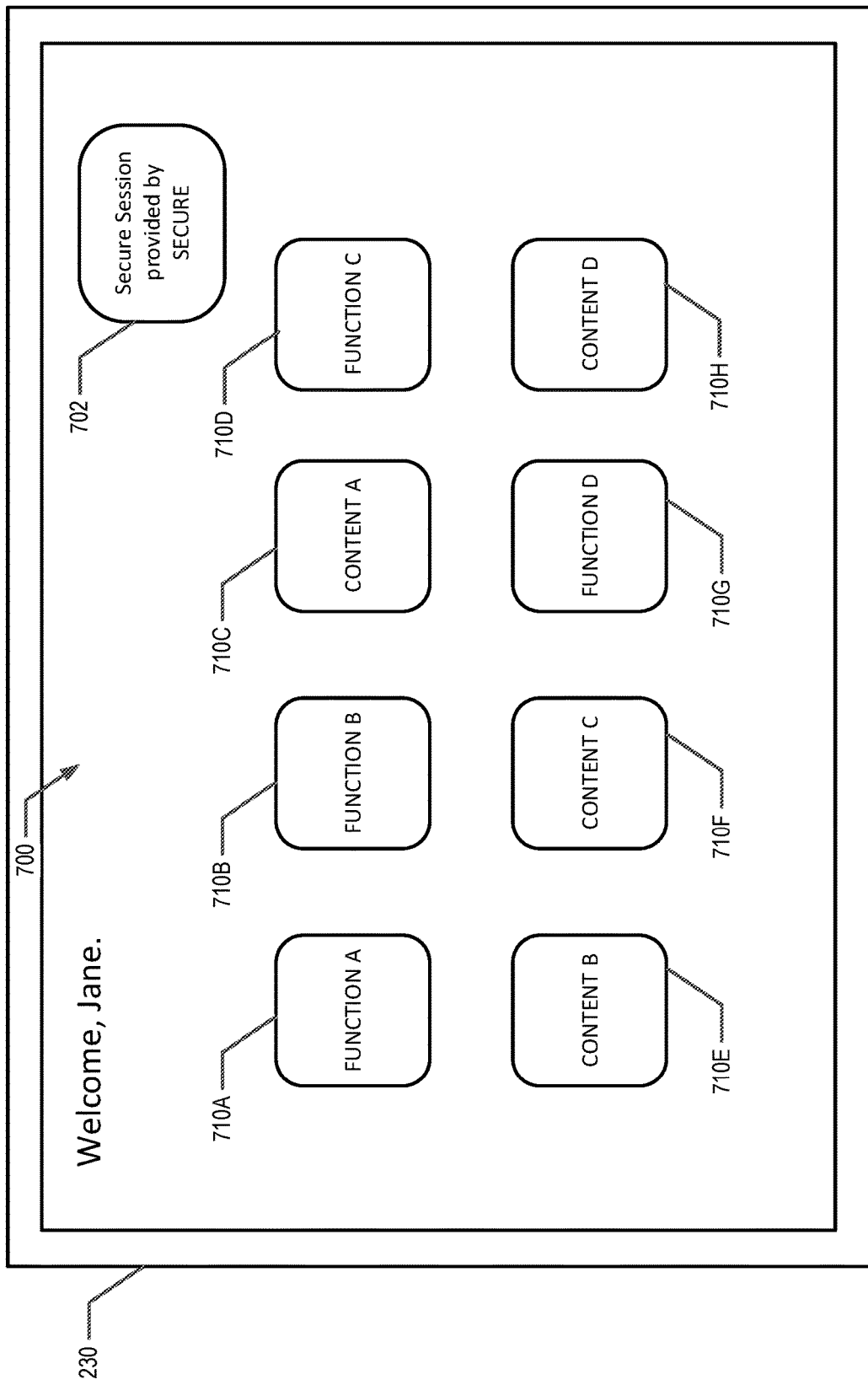
Figure 8:
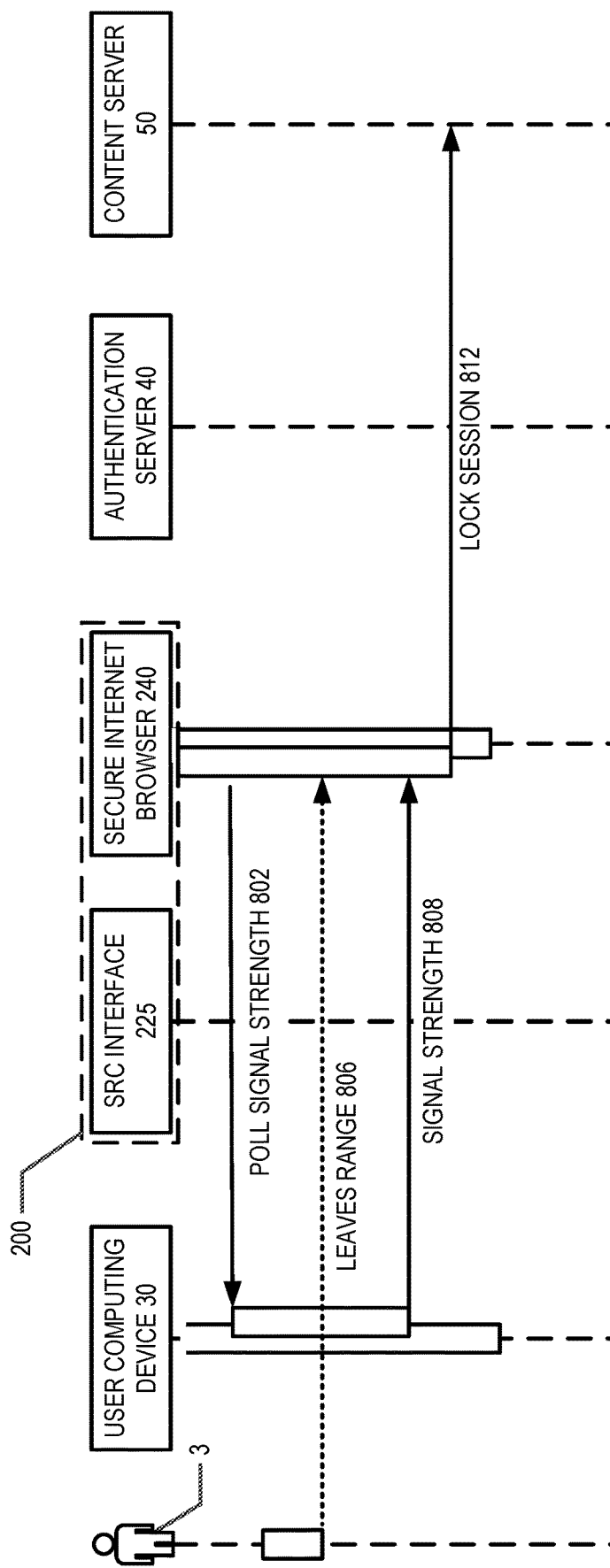

FIG. 5 provides a flowchart illustrating example steps, processes, procedures, and/or operations of installing and activating a secure Internet or web browser, portal, user interface, and/or the like and establishing a user profile, in accordance with an example embodiment of the present invention;

FIG. 6 provides a control flow diagram illustrating example steps, processes, procedures, operations, communications, and/or messages used in authenticating a user to initiate a secure session, in accordance with an example embodiment;

FIG. 6A provide a control flow diagram illustrating example steps, processes, procedures, operations, communications, and/or messages used in authenticating a user to initiate a secure session, in accordance with another example embodiment;

FIG. 7 illustrates an example view of an example personalized landing page provided by a secure Internet browser as part of a secure session, according to an example embodiment; and FIG. 8 provides a control flow diagram illustrating example steps, processes, procedures, operations, communications, and/or messages used to terminate the secure session, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW

In various embodiments, methods, systems, apparatuses, computer program products, and/or the like are provided for a proximity-based authentication of a user to provide the user with one or more functions via a secure Internet or web browser, portal, and/or other secure user interface (referred to generically herein as the secure Internet browser) via a secure computing device. For example, in various embodiments, a secure Internet browser operating, executing, and/or provided by a secure computing device causes the secure computing device to detect whether a user computing device is within an authentication distance or range of the secure computing device. When a known user computing device is detected and/or identified within the authentication distance or range of the secure computing device, an authentication may be used to confirm the identity of the user computing device and/or the corresponding user. For example, a known user computing device may be a user computing device that was previously paired with the secure computing device and/or the secure Internet browser. For example, a device identifier corresponding and/or identifying a known user computing device may be stored in a user profile corresponding to the user. In various embodiments, the authentication of the user computing device is performed using one or more SRC protocols. In an example embodiment, the authentication of user computing device may comprise requesting user input via the user computing device. For example, the user may be prompted to provide biometric input. For example, the user computing device may perform a fingerprint authentication, iris authentication, face authentication, and/or the like. In an example embodiment, the user may be prompted to unlock the user computing device as part of the authentication of the user computing device and/or corresponding user.

In various embodiments, one or more functions are provided via the secure Internet browser. For example, in various embodiments, a secure session of a secure Internet browser may be initiated and/or established, by the secure computing device, that is personalized for a first user based on a first user profile responsive to the secure computing device identifying a known user computing device associated with the first user within the proximity of the secure computing device. For example, a first user profile corresponding to the first user may comprise information/data, preferences, credentials and/or the like that determines what functionality is provided to the first user upon authentication of the first user via a corresponding first user computing device and a second user profile corresponding to the second user may comprise information/data, preferences, credentials and/or the like that determines what functionality is provided to the second user upon authentication of the second user via a corresponding second user computing device. In an example embodiment, the one or more functions may comprise application functionality (e.g., one or more secured applications, programs, and/or the like and/or access to functions of one or more secured applications, programs), retrieval and display of particular content (e.g., confidential content and/or other content) in a secured environment, and/or the like.

In an example embodiment, when the secure computing device provide the user with functions via the secure Internet browser determines that the user computing device has moved such that the user computing device is not located within a lock distance or range and/or has not been located within the lock distance or range for a predetermined time period, the secure Internet browser may log-off the user, lock and/or hide the interactive user interface provided by the secure Internet browser, and/or the like.

II. COMPUTER PROGRAM PRODUCTS, METHODS, AND COMPUTING DEVICES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, and/or the like. As such, embodiments of the present invention may take the form of a data structure, apparatus, system, computing device, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specificallyconfigured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1:
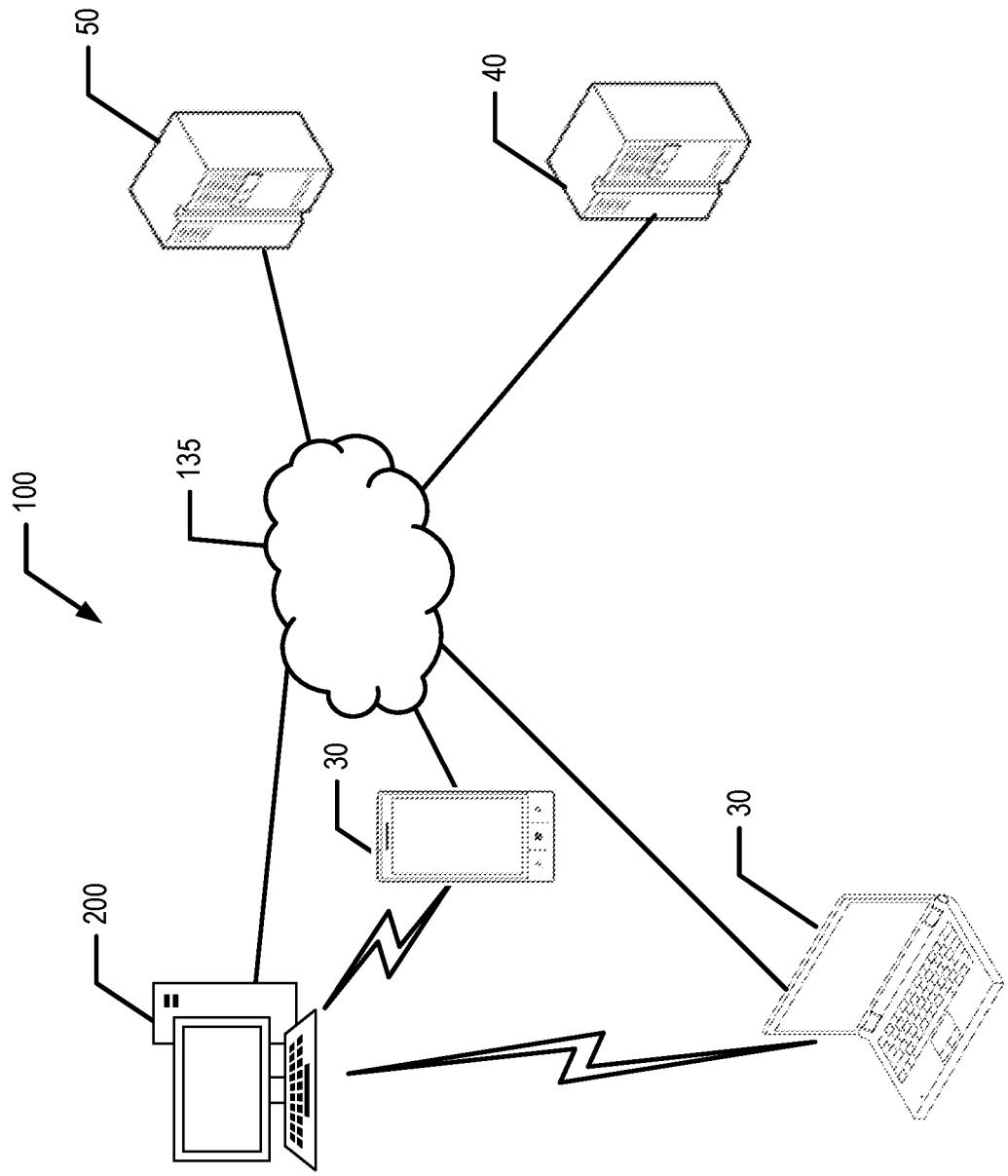
FIG. 1 is a diagram of a system that can be used to practice various embodiments of the present invention.

FIG. 1 provides an illustration of a system 100 that can be used in conjunction with various embodiments of the present invention. As shown in FIG. 1, the system 100 may comprise one or more first computing devices 200 (referred to as secure computing devices 200 herein), one or more second computing devices 30 (referred to as user computing devices 30 herein), one or more authentication servers 40, one or more content servers 50, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system devices as separate, standalone devices, the various embodiments are not limited to this particular architecture.

a. Exemplary Secure Computing Device

Figure 2:
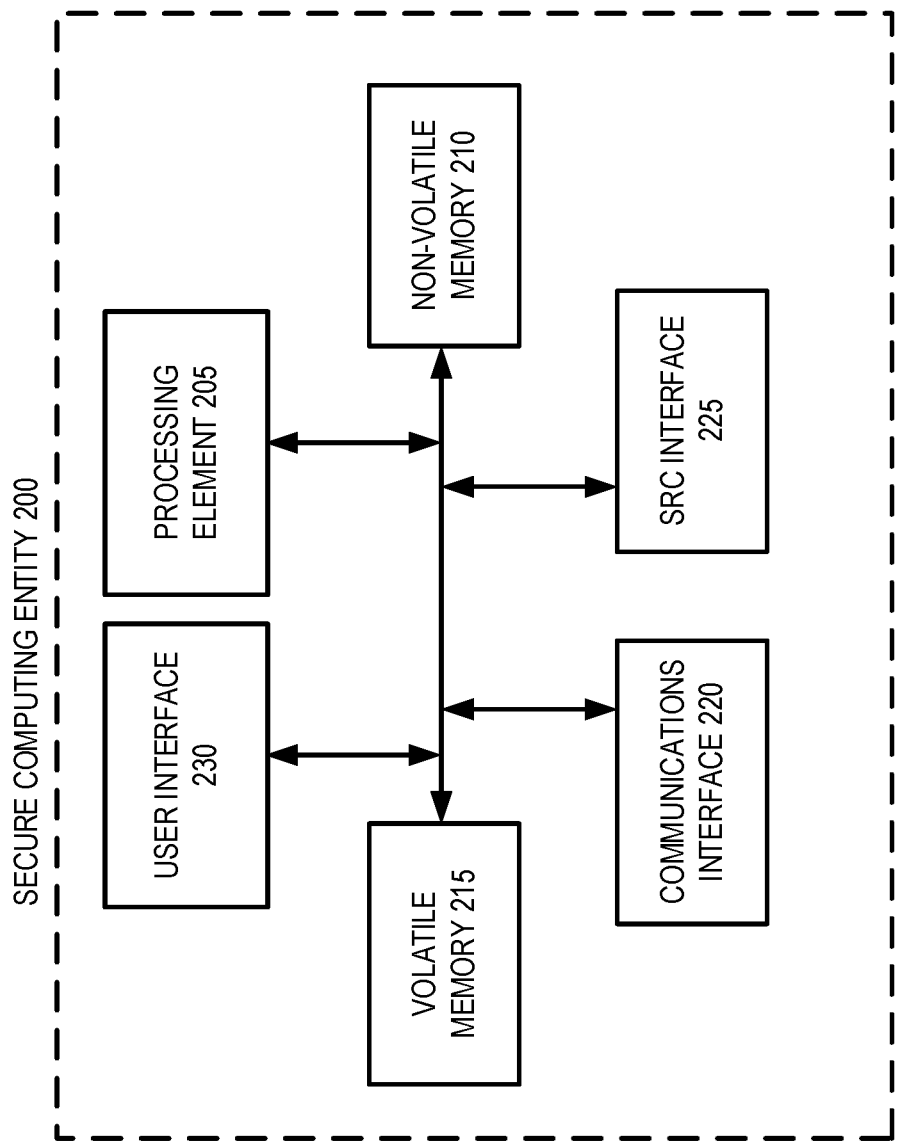
FIG. 2 is a schematic of a secure computing device in accordance with certain embodiments of the present invention.

FIG. 2 provides a schematic of a secure computing device 200 according to one embodiment of the present invention. In general, the terms computing device, device, device, system, and/or similar words used herein interchangeably may refer to, for example, one or more computers, computing devices, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. For example, in various embodiments, the secure computing device 200 may be a desktop computer, a client terminal, a laptop, automated teller machine (ATM), heating, ventilation, and air conditioning (HVAC) control panel, security system control panel, appliance supporting and/or participating in the Internet of things (IoT), a smart wearable device, a car infotainment center, kiosk, and/or other computing device. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the secure computing device 200 may also include one or more network and/or communications interfaces 220 for communicating with various computing devices, such as by communicating data, content, information, and/or similar terms used herein interchangeably that can be transmitted, received, operated on, processed, displayed, stored, and/or the like. For instance, the secure computing device 200 may communicate with one or more authentication servers 40, one or more content servers 50, one or more other secure computing devices 200, one or more user computing devices 30, and/or the like.

As shown in FIG. 2, in one embodiment, the secure computing device 200 may include or be in communication with one or more processing elements 205 (also referred to as processors, processing circuitry, and/or similar terms used herein interchangeably) that communicate with other elements within the secure computing device 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing devices, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the secure computing device 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the secure computing device 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the secure computing device 200 with the assistance of the processing element 205 and the operating system.

As indicated, in one embodiment, the secure computing device 200 may also include one or more network and/or communications interfaces 220 for communicating with various computing devices, such as by communicating data, content, information, and/or similar terms used herein interchangeably that can be transmitted, received, operated on, processed, displayed, stored, and/or the like. For instance, the secure computing device 200 may communicate with one or more authentication servers 40, one or more content servers 50, one or more other secure computing devices 200, one or more user computing devices 30, and/or the like.

As indicated, in one embodiment, the secure computing device 200 may also include one or more network and/or communications interfaces 220 for communicating with various computing devices, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the computing device 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing device 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In various embodiments, the secure computing device 200 further comprises an SRC interface 225 configured for communicating via one or more SRC protocols. For example, the SRC interface 225 may be configured for communicating with various computing devices, such as by communicating data, content, information, and/or similar terms used herein interchangeably that can be transmitted, received, operated on, processed, displayed, stored, and/or the like via one or more SRC protocols. For example, the SRC interface 225 may be configured to communicate via one or more of Bluetooth protocols, low energy Bluetooth protocols (e.g., iBeacon, and/or the like), NFC protocols, RFID protocols, IR protocols, Wi-Fi protocols, ZigBee protocols, Z-Wave protocols, 6LoWPAN protocols, and/or other communication protocol that is operable in at least a range of, for example, up to five feet, up to ten feet, up to thirty feet, up to fifty feet, up to a hundred feet, and/or the like. In an example embodiment, the SRC interface 225 comprises a transmitter antenna and/or a receiver antenna. In an example embodiment, the SRC interface 225 is a Bluetooth listener and/or the like. In an example embodiment, the SRC interface 225 is configured to communicate with one or more user computing devices 30 located within a distance or range around the secure computing device 200. For example, in an example embodiment, if a user computing device 30 is detected to be within an authentication distance and/or range of the secure computing device 200 and/or within the authentication distance and/or range for at least a minimum length of time, the secure Internet browser may be configured to authenticate and/or log in the user. In another example, in an example embodiment, if a user computing device 30 corresponding to a user that is logged-in to a secure session via the secure Internet browser is determined to be located outside of a lock distance and/or range from the secure computing device 200 and/or that the user computing device 30 is outside of the lock distance and/or range for at least a minimum length of time, the secure session may be locked and/or the corresponding user may be logged off from the secure Internet browser. In an example embodiment, the first and/or lock distance or range from the secure computing device 200 is predetermined and defines a predefined region or area around the secure computing device 200. In an example embodiment, the first and/or lock distance or range is located within a signal range of the SRC interface 225 corresponding the SRC protocol. In various embodiments, the authentication distance or range may be one to ten feet from the secure computing device 200. For example, the authentication distance or range may define a first zone that extends a distance one to ten feet from the secure computing device 200. In various embodiments, the lock distance or range may be five to twenty feet from the secure computing device 200. For example, the lock distance or range may define a second zone that extends a distance five to twenty feet from the secure computing device 200.

In an example embodiment, the secure computing device 200 comprises a user interface 230. In an example embodiment, the user interface 230 comprises one or more output devices. For example, the output devices may comprise one or more displays, monitors, and/or other visual output devices and/or elements, one or more speakers and/or audio output devices and/or elements, and/or the like. In an example embodiment, the user interface 230 comprises one or more input devices. For example, the input devices may be configured to receive user input. For example, the input devices may comprise one or more mouses, touchscreens, soft and/or hard keyboards and/or keypads, microphones, and/or other user input device. For example, the user interface 230 may be configured to provide a user with an interactive user interface (e.g., such as the example landing page 700 shown in FIG. 7), receive user input interacting with the interactive user interface, and communicate indications of user input to the processing element 205 for appropriate processing and updates/changes to the interactive user interface. As will be appreciated, one or more of the secure computing device's 200 components may be located remotely from other secure computing device 200 components, such as in a distributed system. Furthermore, one or more of the components may be aggregated and additional components performing functions described herein may be included in the secure computing device 200. Thus, the secure computing device 200 can be adapted to accommodate a variety of needs and circumstances.

b. Exemplary User Computing Device

Figure 3:
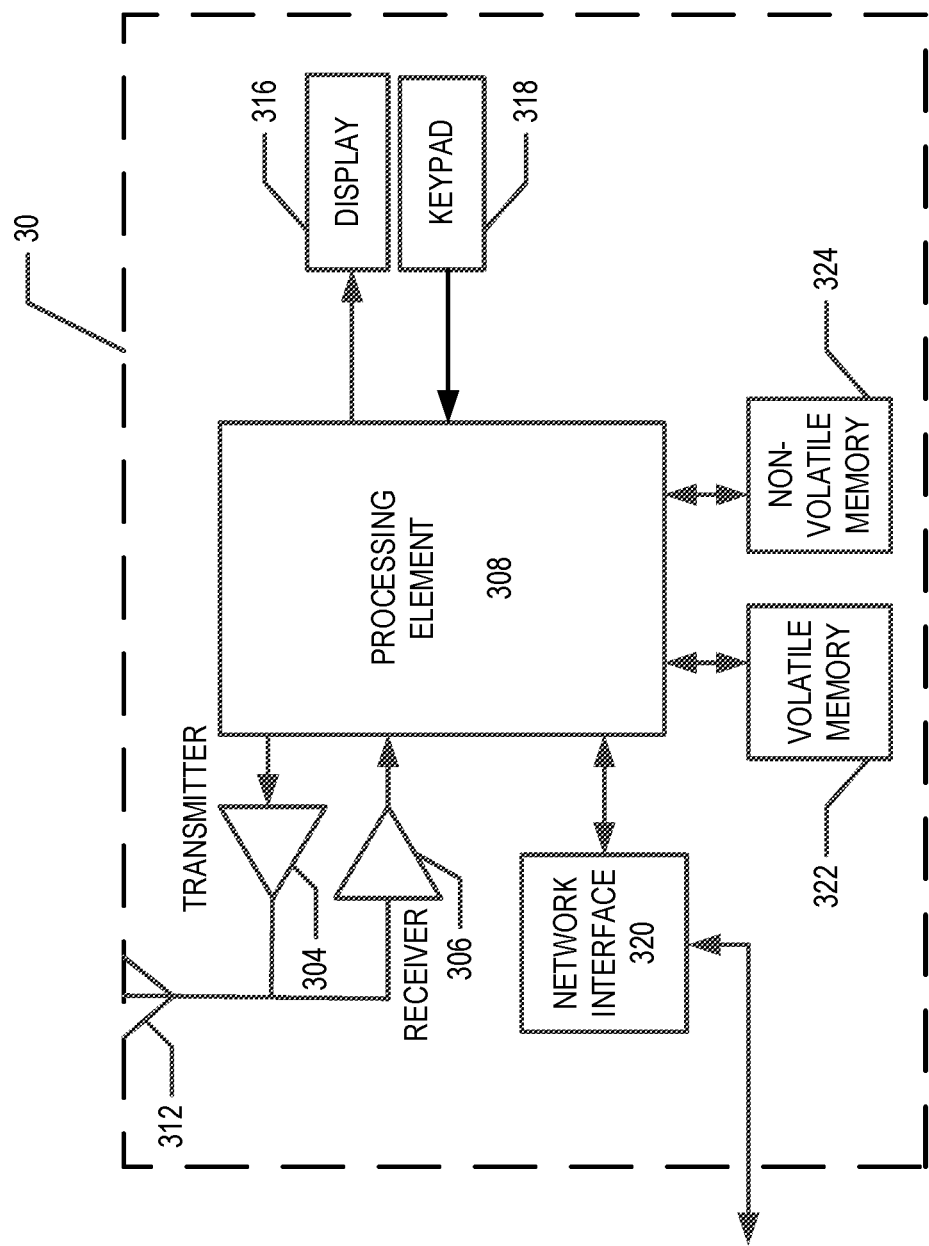
FIG. 3 is a schematic of a user computing device in accordance with certain embodiments of the present invention.

FIG. 3 provides an illustrative schematic representative of user computing device 30 that can be used in conjunction with embodiments of the present invention. In various embodiments, the user computing device 30 may be any mobile device and/or computing device that is capable of providing, broadcasting, and/or transmitting an SRC signal. For example, a user computing device 30 may be a smart phone, wearable device (e.g., smart glasses, smart watch, fob, RFID key card, Fitbit, and/or the like), tablet, laptop, and/or the like.

As shown in FIG. 3, a user computing device 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various devices, such as a secure computing device 200, another user computing device 30, and/or the like. In an example embodiment, the transmitter 304 and/or receiver 306 are configured to communicate via one or more SRC protocols. For example, the transmitter 304 and/or receiver 306 may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol.

In this regard, the user computing device 30 may be capable of operating with one or more air interface standards, communication protocols, modulation types, and access types. More particularly, the user computing device 30 may operate in accordance with any of a number of wireless communication standards and protocols. In a particular embodiment, the user computing device 30 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing device 30 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing device 30 can also download changes, add-ons, and updates, for instance, to its firmware, software (e.g., including executable instructions, applications, program modules), and operating system.

According to one embodiment, the user computing device 30 may include location determining aspects, devices, modules, functionalities, and/or similar words used herein interchangeably. For example, the user computing device 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing device's 30 position in connection with a variety of other systems, including cellular towers, Wi-Fi access points, and/or the like. Similarly, the user computing device 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The user computing device 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing device 30 to cause display or audible presentation of information/data and for user interaction therewith via one or more user input interfaces. The user input interface can comprise any of a number of devices allowing the user computing device 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing device 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing device 30 can collect information/data, user interaction/input, and/or the like.

In various example embodiments, the user computing device 30 may comprise one or more user input devices for receiving input authenticating a user. For example, the user computing device 30 may comprise a touch sensitive region and/or display for capturing a fingerprint scan, in an example embodiment. In another example, the user computing device 30 may comprise a camera and/or image capturing device for capturing one or more images for performing iris and/or face authentication. In another example, the user computing device 30 may comprise keypad 318 for receiving a personal identification number (PIN) for authenticating a user. As should be understood, the user computing device 30 may comprise various elements for receiving user input (e.g., biometric input and/or the like) that may be used for authenticating a user of the user computing device 30.

The user computing device 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing device 30.

c. Exemplary Authentication Server

In various embodiments, the system 100 further comprises one or more authentication servers 40 configured to communicate with one or more user computing devices 30, secure computing devices 200, and/or content servers 50 via one or more wired and/or wireless networks 135. In an example embodiment, the authentication server 40 is a computing device configured to provide one or more secure functions to a user via the secure computing device 200. In an example embodiment, the authentication server 40 may be configured to request and/or receive one or more user computing device authentication requests (e.g., via the network 135), store a plurality of user profiles, store information/data corresponding to a plurality of user accounts, provide secure access to one or more websites, and/or the like. In an example embodiment, the authentication server 40 comprises one or more elements similar to those described above with respect to secure computing device 200 and/or user computing device 30. For example, various embodiments, the authentication server 40 comprises one or more processing elements and/or processing devices, volatile and/or non-volatile memory, communication and/or network interfaces, and/or the like.

d. Exemplary Content Server

In various embodiments, the system 100 further comprises one or more content servers 50 configured to communicate with one or more user computing devices 30, secure computing devices 200, and/or authentication servers 40 via one or more wired and/or wireless networks 135. In an example embodiment, the content server 50 is a computing device configured to provide application functionality, provide access to content, store and provide one or more websites and/or website information/data of a website, and/or a combination thereof such that functionality and/or content may be provided in the secure environment of the secure Internet browser via the secure computing device 200. In an example embodiment, at least one of the one or more content servers 50 may also perform one or more functions described as being performed by the authentication server 40 herein. In an example embodiment, the content server 50 comprises one or more elements similar to those described above with respect to secure computing device 200 and/or user computing device 30. For example, various embodiments, the content server 50 comprises one or more processing elements and/or processing devices, volatile and/or non-volatile memory, communication and/or network interfaces, and/or the like.

e. Exemplary Networks

In one embodiment, any two or more of the illustrative components of the architecture of FIG. 1 may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. EXEMPLARY SYSTEM OPERATION

Various embodiments provide for a proximity-based authentication of a user to provide the user with one or more functions via a secure computing device 200. In various embodiments, one or more functions are provided via a secure Internet browser. For example, in various embodiments, a secure session of a secure Internet browser may be initiated and/or established, by the secure computing device 200, that is personalized for a first user based on a first user profile responsive to the secure computing device 200 identifying a known user computing device 30 associated with the first user within the proximity of the secure computing device 200.

As used herein a secure session is a set and/or series of interactions and/or communications between the secure Internet browser and a server (e.g., the authentication server 40 and/or a content server 50). The session (e.g., set and/or series of interactions and/or communications) is initiated when the server (e.g., the authentication server 40 and/or content server 50) identifies the secure Internet browser operating on the secure computing device 200 as a client and ties information/data to that client. The session is secure in that the client (e.g., the secure computing device, secure Internet browser, and/or user) are authenticated. The session (e.g., set and/or series of interactions and/or communications) ends after a predetermined period of activity or when the user explicitly ends the session (e.g., by walking away, closing the secure Internet browser, logging out of the operating system of the secure computing device 200, powering down and/or turning off the secure computing device 200).

a. Exemplary Secure Internet Browser

Figure 4:
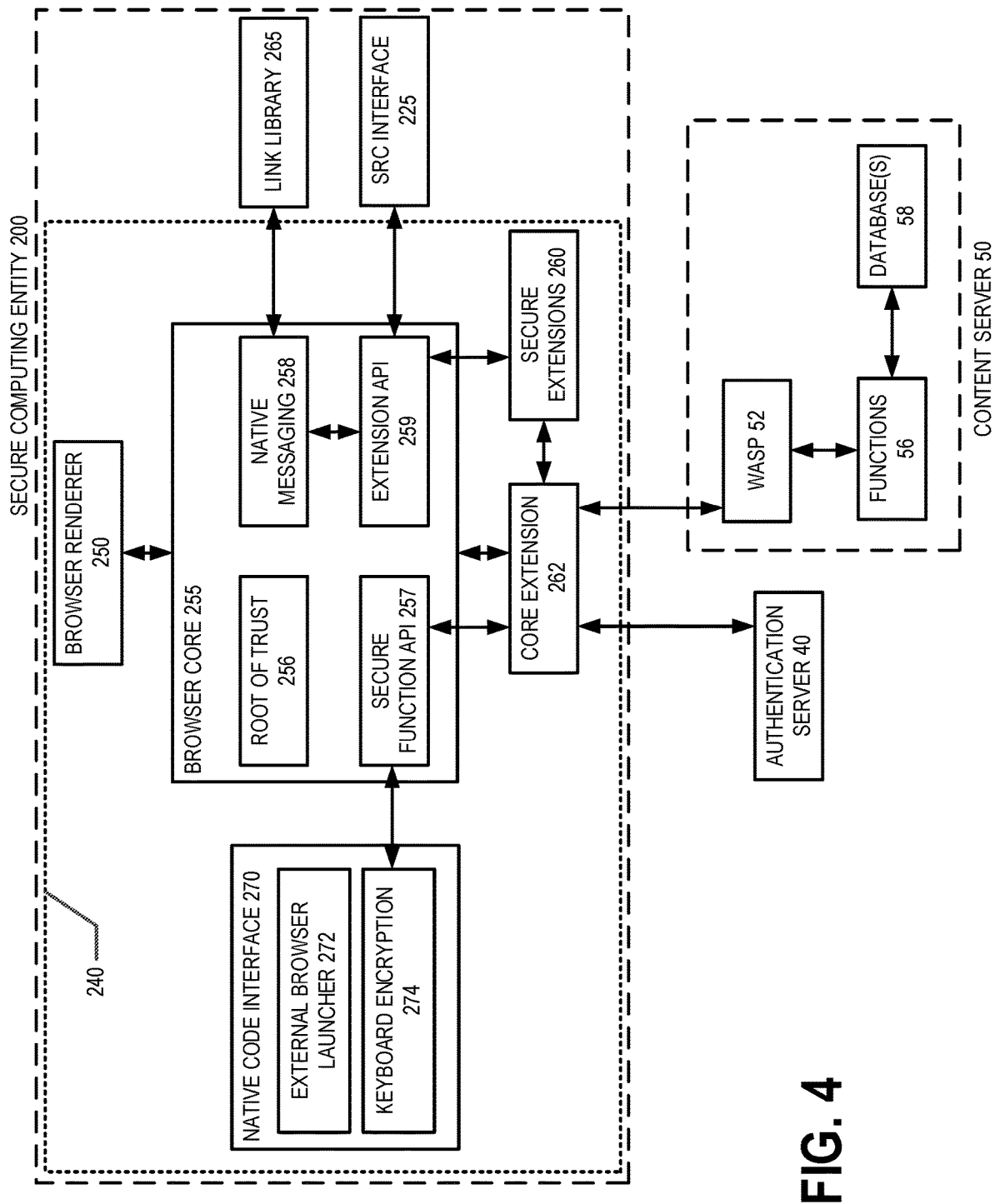
FIG. 4 is a schematic diagram of an example secure user interface operating on a secure computing device and that provides secure sessions through connection with a content server, in accordance with an example embodiment of the present invention.

FIG. 4 provides a schematic diagram of an example secure Internet browser 240 operating on a secure computing device 200 and that provides secure sessions for one or more users leveraging interaction with one or more authentication servers 40. In an example embodiment, the secure Internet browser 240 may be a hardened client that secures the web channel for accessing one or more functions and/or services provided by and/or via the authentication server 40 and related and/or allowed destinations (e.g., URLs, domains, and/or the like) on behalf of the user. For example, the secure computing device 200 may comprise memory 210 or 215 having stored therein computer program code, computer-executable instructions, and/or the like. The computer program code, computer-executable instructions, and/or the like may comprise one or more code portions corresponding to a secure Internet browser renderer 250, a browser core 255, one or more native code interfaces 270, a core extension 262, one or more secure extensions 260, a link library 265, a driver for operating the SRC interface 225, and/or the like.

In an example embodiment, the browser core 255 comprises a set of computer executable code portions, computer-executable instructions, and/or the like that provides the core and/or foundational elements of the secure Internet browser 240. In an example embodiment, the browser core 255 is based on Chromium and comprises a root of trust 256. In various embodiments, a root of trust 256 is a set of one or more functions in a trusted computing module that are always trusted by the computing device's operating system (OS). For example, the root of trust 256 serves as a separate computing engine controlling the trusted computing platform cryptographic processor on the computing device in which it is embedded. In an example embodiment, the browser core 255 also comprises one or more secure function application programming interfaces (APIs) 257. In an example embodiment, the secure function API(s) 257 are configured to interface with various security extensions, enable encrypted communication with the browser core 255, and/or the like. The browser core 255 may also comprise a native messaging component 258 configured to communicate with one or more libraries (e.g., including the link library 265) stored by the secure computing device 200 (e.g., in memory 210 or 215), For example, the link library 265 may be an mshtml.dll library and/or the like. In an example embodiment, the browser core 255 comprises one or more extension APIs 259. The one or more extension APIs 259 may be configured to interface with one or more secure extensions 260, core extensions 262, and/or the like to provide additional functionality and/or features via the secure Internet browser 240. For example, the one or more extension APIs 259 may expose one or more functions and/or features of the browser core 255 such that additional functions and/or features may be provided as part of the secure Internet browser and/or user interface. In an example embodiment, the one or more extension APIs 259 may comprise one or more SRC interface APIs that enable the secure Internet browser to communicate with the SRC interface 225.

In various embodiments, the secure Internet browser renderer 250 is configured to render the interactive user interface of the secure Internet browser 240 for display and/or provision via one or more output devices of the user interface 230. In an example embodiment, the native code interfaces 270 may comprise an external browser launcher 272 configured to launch an interactive user interface of the secure Internet browser 240 in response to, for example, a user being authenticated using a proximity-based authentication technique. The native code interfaces 270 may comprise a keyboard encryption element 274 configured to encrypt the information/data provided via user input to a keyboard so as to prevent unauthorized devices from obtaining unencrypted key stroke information/data from the secure computing device 200. In various embodiments, the core extension 262 comprises computer program code portions, computer-executable instructions, and/or the like that, when executed by the processing element 205, cause the establishment, operation, and/or ending of a secure session with an authentication server 40.

In an example embodiment, the secure computing device 200 and authentication server 40 and/or content server 50 receive and provide (e.g., send, transmit, and/or the like) secure and/or encrypted messages, packets, information/data, and/or the like to one another via the network 135. In an example embodiment, the authentication server 40 is configured and/or programmed to provide one or more authentication features for authenticating a user. For example, the authentication server 40 may be configured and/or programmed to communicate with a detected known user computing device 30 to prompt the user to provide authentication information/data and/or input via the user computing device 30, to authenticate a user based on the authentication information/data and/or input received via the user computing device 30, and/or communicate the authentication of a user to the secure computing device 200. In an example embodiment, the authentication server 40 is not an individual server. For example, in an example embodiment, the functions described herein as being performed by the authentication server 40 may be performed as cloud-based functions. In an example embodiment, the authentication server 40 may store one or more user profiles (e.g., in a user profile database similar to user profile database 48) and provide the user profile information/data for the authenticated user to the secure Internet browser 240 operating and/or executing on the secure computing device 200

In an example embodiment, the content server 50 comprises a Web Application Security Platform (WASP) 52. In an example embodiment, the WASP 452 may be an open web application security project platform. In various embodiments, the WASP 452 is a Web application firewall through which communication with the content server 50 is accessed. In an example embodiment, the content server 50 comprises computer program code portions, computer-executable instructions, and/or the like for providing one or more secure applications/functions 56. For example, the computer program code portions, computer-executable instructions, and/or the like for providing one or more secure applications/functions 56 may be stored in a non-transitory memory of the content server 50. In an example embodiment, the content server 50 may store in local memory and/or have access to one or more user profile databases 58. In various embodiments, the one or more user profile databases 58 may comprise one or more user profile databases storing user profile information/data as discussed in more detail below. In various embodiments, the one or more user profile databases 58 may store user account information/data corresponding to one or more user accounts of the one or more secure applications and/or corresponding to one or more secure functions, financial accounts corresponding to one or more user profiles, and/or the like.

In an example embodiment, when the interactive user interface of the secure Internet browser 240 is launched, the secure Internet browser 240 may be restricted to a landing page. For example, the interactive user interface of the secure Internet browser 240 may be rendered to and/or displayed via the user interface 230 such that the landing page is provided and/or displayed. The landing page may be defined and/or personalized based on user profile information corresponding to the user. For example, the authentication of a user may cause the establishment of a secure session with the content server 50 such that the user may access one or more secure functions provided by the content server 50 through the use of the secure Internet browser 240 operating on the secure computing device 200 and the launching of an interactive user interface of the secure Internet browser 240, the rendering of a landing page personalized for the user based on the user profile corresponding to the user.

In various embodiments, the landing page may provide the user with one or more user-selectable links, icons, graphics, tiles, and/or the like that a user may select to access one or more functions provided by the content server 50 through the secure Internet browser 240. In an example embodiment, at least one of the one or more functions corresponds to a financial function such as online banking and/or the like. In an example embodiment, at least one of the one or more functions corresponds to and/or includes the use of confidential information/data.

In various embodiments, the secure Internet browser 240 may restrict the navigation to a configurable allowed set of websites, domains, applications, functions, and/or the like. In various embodiments, the configurable allowed set of websites, domains, applications, functions, and/or the like may be specific to a user (e.g., based on preferences and/or access control constraints stored in the corresponding user profile) and/or a group to which that user belongs (e.g., as indicated by the corresponding user profile). For example, in an example embodiment, the URL bar may be restricted from use (e.g., be view only). In another embodiment, if a user enters a URL into the navigation bar that does not correspond to one of the websites and/or domains of the allowed set, the secure computing device 200 does not send a content request to the content server 50 storing the user entered URL. However, if a user enters and/or selects a tile, link, and/or the like corresponding to a website, domain, application, function, and/or the like of the allowed set, the secure computing device 200 does send a content request to the content server 50 storing the user entered and/or selected URL.

b. Exemplary Set Up

In various embodiments, prior to a user being automatically authenticated using a proximity-based authentication technique at a secure computing device 200, the secure Internet browser 240 is installed and/or activated on the secure computing device 200 and a user profile corresponding to the user is generated. The user profile may be stored by the secure computing device 200, the user computing device 30, the authentication server 40, and/or the content server 50, in various embodiments. FIG. 5 provides a flowchart illustrating process, procedures, and/or operations of installing and/or activating a secure Internet browser 240 on the secure computing device 200 and generating a user profile, according to an example embodiment.

Starting at step/operation 502, the secure Internet browser 240 is installed on the secure computing device 200. For example, the computer program code portions, computer-executable instructions, and/or the like corresponding to the secure Internet browser 240 are installed on the secure computing device 200. For example, the computer program code portions, computer-executable instructions, and/or the like corresponding to the secure Internet browser 240 may be stored in memory 210, 215 and one or more installation program codes may be initiated and/or run to install the secure Internet browser 240 on the secure computing device 200. In an example embodiment, the computer program code portions, computer-executable instructions, and/or the like corresponding to the secure Internet browser 240 may be downloaded (e.g., via network 135) from the authentication server 40, a content server 50, a software download server site, a file transfer protocol (FTP) site/server, an FI site (e.g., a Project Fi site/network), removable media (e.g., thumb drive, compact disc, magnetic storage device, floppy disc), and/or the like.

At step/operation 504, the secure Internet browser 240 is activated. For example, the first time a user attempts to launch and/or operate an interactive user interface of the secure Internet browser 240, and/or as part of the installation process, the user may be required to enter a previously provided (possibly through an out-of-band mechanism) activation key (e.g., using a keyboard and/or other input device). For example, the authentication server 40 and/or content server 50 may provide the user with an activation key (e.g. via the user computing device 30). In one embodiment, the authentication server 40 and/or content server 50 may provide the activation key out of band. For instance, the authentication server 40 and/or content server 50 may provide the authentication key in an email, text or multi-media message, app message, instant message, voice message, automated phone call, and/or the like. The user may then provide input comprising the activation key via one or more input devices of the secure computing device 200. In an example embodiment, the activation key may be provided to the user (e.g., via the user computing device 30) responsive to the installment of the computer program code portions, computer-executable instructions, and/or the like corresponding to the secure Internet browser 240 on the secure computing device 200. For example, the installation program codes may be configured and/or programmed to generate and provide (e.g., cause the communications interface 220 to transmit) a request for an activation key. The authentication server 40 and/or content server 50 may receive the request, generate the activation key, and provide (e.g., transmit) the activation key to a user computing device 30, secure computing device 200, and/or another computing device such that the user may be provided with the activation key.

At step/operation 506, a user profile may be established and/or stored. For example, the user profile may be stored by the authentication server 40, content server 50 (e.g., in a user profile database 58), user computing device 30 (e.g., in memory 322, 324), and/or by the secure computing device 200 (e.g., in a data store in memory 210 or 215). In an example embodiment, a user profile comprises user profile information/data. In an example embodiment, the user profile information/data is generated, at least in part, based on user input (e.g., via a user input device) of the user computing device 30 and/or the secure computing device 200. The user profile information/data may comprises one or more of a user identifier configured to uniquely identify the user, username, user contact information/data (e.g., name, mailing address; street address; one or more phone numbers; one or more electronic addresses such as emails, instant message usernames, social media user name, and/or the like), user preferences, user account information/data (e.g., identifying information/data corresponding to one or more user accounts maintained by one or more devices, such as bank account information/data, vendor account(s) information/data, and/or the like), user credentials for one or more user accounts maintained by one or more devices (e.g., log in information/data for an online banking portal, log in information for an online retailer/vendor, and/or the like), information/data identifying one or more user computing devices 30 corresponding to the user (e.g., one or more known user computing devices that are paired with a particular secure computing device 200 and/or with the user profile generally), user profiles, device profiles, and/or the like.

In various embodiments, the user profile may be generated and/or the user profile information/data may be stored (e.g., by the authentication server 40, content server 50, and/or user computing device 30) prior to the installation and activation of the secure Internet browser 240 on the secure computing device 200. For example, the user may establish one or more user accounts prior via a content server 50 and/or other computing device prior to the installation of the secure Internet browser on the secure computing device 200 and the information/data corresponding to the user accounts may be stored in a corresponding user profile. In another example, the user profile may be generated by the secure computing device 200 after the activation of the secure Internet browser 240. For example, the user may be prompted through the secure Internet browser 240 to enter user profile information/data that may then be used to generate a user profile corresponding to the user and that may be stored by the secure computing device 200, authentication server 40, and/or content server 50. In an example embodiment, the user may provide information/data identifying one or more user accounts to be associated with the user profile and user profile information/data may be mined based on the information/data corresponding to the one or more user accounts. In an example embodiment a user account may be an account corresponding to the user and corresponding to an access-controlled application and/or an entity/device providing and/or associated with an access-controlled application. The authentication server 40, content server 50, and/or secure computing device 200 may store a plurality of user profiles (e.g., in database 58). In an example embodiment in which the user computing device 30 stores the user profile, the user computing device 30 may only store one user profile (e.g., the user profile corresponding to the user corresponding to the user computing device 30). For example, the secure computing device 200 may be configured to provide a secure Internet browser 240 that may be personalized to the currently authenticated and/or active user based on the user profile information/data of the user profile corresponding to the currently authenticated and/or active user.

At step/operation 508, the user may generate a passkey. For example, as part of generating and/or providing the user profile information/data, the user may be prompted (e.g., via a user interface and/or via the secure Internet browser 240) to enter a passkey, passcode, password, personal identification number (PIN), biometric information/data, gesture information/data, and/or other information/data and/or input for generating and/or establishing an authentication token, generally referred to herein as a passkey. The passkey, possibly along with a username and/or the like, may be used to log the user onto the secure Internet browser 240 and/or to authenticate the user for a personalized experience via the secure Internet browser 240. In an example embodiment, the passkey may be stored as part of the user profile information/data. In another example, the passkey may be used to encrypt a soft token stored by the secure computing device 200 (e.g., in memory 210, 215), such that when the user enters the passkey into a log in screen corresponding to the secure Internet browser 240, the passkey is used to decrypt the soft token and the soft token is provided to the authentication server 40 to establish a secure and/or personalized session for the user and/or the content server 50 to access secured content corresponding to the user.

In an example embodiment, before the passkey is established, a user provides an authentication code. For example, responsive to a secure computing device 200 providing the user provided and/or generated passkey to the authentication server 40, the authentication server 40 may generate a verification code that is sent to the user out of band (e.g., in an email, text or multi-media message, instant message, voice message, automated phone call, and/or the like based, for example, on the user profile information/data). The user may then provide input comprising the verification code via one or more input devices of the secure computing device 200 to verify that the passkey is being provided by the user corresponding to the user profile.

At step/operation 510, the user may pair one or more user computing devices 30 to the secure computing device 200 and/or the user profile corresponding to the user. For example, a secure computing device 200 can be paired to multiple users to provide each user with secure access to the secure Internet browser 240 and its functionality. To do so, the user may operate the secure computing device 200 and/or a user computing device 30 to pair a user computing device 30 to the secure computing device 200 and/or a user profile corresponding to the user. In an example embodiment, the pairing of the user computing device 30 to the secure computing device 300 and/or the user profile may be performed via and/or prompted by the secure Internet browser 240. In an example embodiment, the user computing device 30 may be more generally paired with the secure computing device 200. For example, if the secure computing device 200 is a user's work and/or personal computer, the user may have already paired a user computing device 30 (e.g., smart watch, smart phone, wireless earbuds, and/or the like) for use with the secure computing device 200.

Pairing a user computing device 30 to a secure computing device 200 generally comprises establishing a connection and/or communication link between the user computing device 30 and the secure computing device 200 via an SRC protocol. The connection and/or communication link between the user computing device 30 and the secure computing device 200 allows the user computing device 30 and the secure computing device 200 to share information/data via the SRC protocol when they are within range of each other. The range is based on the SRC protocol, the SRC interface 225, and the transmitter 304/receiver 306. In various embodiments, the pairing may enable two-way communication or one-way communication between the user computing device 30 and the secure computing device 200. For example, in an example embodiment, the SRC protocol is a low energy Bluetooth and the pairing of the user computing device 30 to the secure computing device 200 enables the secure computing device 200 to receive a broadcast signal and/or information/data from the user computing device 30, but may not permit the secure computing device 200 to provide information/data to the user computing device 30 via the SRC protocol.

As part of the pairing process, the user computing device 30 transmits and/or provides the device identifier that uniquely identifies the user computing device 30 to the secure computing device 200 via the SRC protocol. In an example embodiment, the secure computing device 200 and/or the authentication server 40 (e.g., as part of the user profile information/data) stores a device identifier identifying the paired and/or known user computing device 30. In various embodiments, the device identifier is generated by the user computing device 30, assigned to the user computing device 30 (e.g., using a subscriber identity module (SIM) card and/or other hardware element of the user computing device 30, and/or assigned to the user computing device 30 responsive to the installation of a particular application on the user computing device 30, and/or the like. Generally, the device identifier is stored in memory 322, 324 and is transmitted as part of an SRC protocol broadcast indicating the presence of the user computing device 30.

In various embodiments, a user may be able to establish a secure session via the secure Internet browser 240 via a plurality of secure computing devices 200. For example, when a user pairs a user computing device 200 with a first secure computing device 200, the pairing information/data may be propagated to one or more second secure computing devices 200. In various embodiments, the propagating of the pairing information/data may be performed by storing the device identifier in association and/or as part of the user profile corresponding to the user. The user profile may then be provided to and stored by the one or more second secure computing devices 200 (e.g., in a data store stored in memory 210, 215). The secure Internet browser 240 operating on a second secure computing device 200 may then (e.g., via an extension API 259) communicate with the SRC interface 225 of the second secure computing device 200 such that the user computing device 30 is then known to the second secure computing device 200. In an example embodiment, an abridged user profile may be provided to and stored by the second secure computing device 200 (e.g., in a data store stored in memory 210, 215). In an example embodiment, the abridged user profile may comprise only the profile information/data needed to authenticate a user. For example, the abridged user profile may comprise a user identifier, a device identifier, and an authentication token, in an example embodiment. For example, a secure computing device 200 may store a plurality of abridged user profiles such that a plurality of users may (successively) establish secure sessions via the secure Internet browser 240 operating on the secure computing device 200. Additionally, the abridged user profiles may allow a user to (successively) establish secure sessions via secure Internet browsers 240 operating on a plurality of secure computing devices 200. In an example embodiment, the plurality of secure computing devices 200 may be connected via a network (e.g., a local network, mesh network, and/or the like), associated with and/or operated by a particular entity (e.g., organization, company/corporation, division of company, and/or the like)

For example, the secure computing device 200 may be one of two or more secure computing devices 200 at a library, and the user may be a library patron. The user may establish a first secure session via a first secure computing device 200 during a first visit to the library. The establishment of the first secure session may comprise pairing the user computing device 30 with the first secure computing device 200. On a subsequent second visit to the library, the user may establish a second secure session via a second secure computing device 200 without having to pair the user computing device 30 to the second secure computing device 200. Similarly one or more other library patrons may establish secure sessions with the first or second secure computing device 200 between the user's first and second library visits.

In an example embodiment, the pairing information/data (e.g., information/data identifying user computing devices 30 paired to a secure computing device 200 and/or enabling the communication of information/data between user computing device 30 and the secure computing device 200 via the SRC protocol) may be stored locally by the secure computing device 200 (e.g., in memory 210, 215). In another example embodiment, the pairing information/data may be stored by the authentication server 40 and/or by one or more secure computing Devices 200. For example, if the secure computing device 200 is an ATM, a teller computer, a point-of-sale device, and/or the like a plurality of users may use or interact with the secure computing device 200, which may retrieve pairing information/data stored by an authentication server 40 corresponding to one or more user profiles. In an example embodiment, the secure computing device 200 (e.g., a desktop computer, a client terminal, a laptop, automated teller machine (ATM), heating, ventilation, and air conditioning (HVAC) control panel, security system control panel, appliance supporting and/or participating in the IoT, a smart wearable device, a car infotainment center, kiosk, and/or other computing device, etc.) may store pairing information/data for one or more user profiles and/or abridged user profiles locally (e.g., in memory 210, 215) to enable communication between the user computing device 30 and the secure computing device 200 via the SRC protocol. In another example embodiment, the secure computing device 200 (e.g., ATM, teller computer, point-of-sale device, etc.) may prompt the user to pair a user computing device 30 to the secure computing device 200 (optionally in association with the user's user profile) the first time the user uses the secure computing device 200 and/or each time the user uses the secure computing device 200 until the user has paired a device with the secure computing device 200, possibly in association with the user's user profile.

c. Exemplary Unlock/Log On/Authentication

In various embodiments, a user may be automatically logged on and/or authenticated to a secure Internet browser 240 based on a proximity of a user computing device 30 corresponding to a user and a secure computing device 200 on which the secure Internet browser 240 is installed and/or activated for the user. For example, the logging on and/or authenticating of a user may cause the secure computing device 200 to (a) automatically unlock (e.g., log in) an operating system interface and launch a user interface of the secure Internet browser 240, (b) automatically launch an interactive user interface of the secure Internet browser 240 of an unlocked (e.g., logged in) operating system interface, (c) establish a secure session with an authentication server 40 and/or content server 50, (d) personalize the content and/or display of the secure Internet browser 240 based on the user profile corresponding to the user, and/or (e) the like. For example, the personalization of the content and/or display of the secure Internet browser 240 may comprise providing the user with personalized content and/or personalized configuration of selectable tiles, links, and/or the like enabling access to functions or content via the secure Internet browser 240; logging the user into one or more controlled access local or remote Web sites, applications, or accounts associated with one or more service or content providers, financial institutions, vendors, and/or the like (e.g., using various single sign-on techniques); and/or performing one or more other personalizations based on the user profile information/data of the corresponding user profile (e.g., user preferences). In an example embodiment, the secure Internet browser 240 may already be operating on the secure computing device 200 and the logging in and/or authenticating of the user may cause the secure computing device 200 to automatically establish a secure session with an authentication server 40 and/or content server 50 (e.g., via the secure Internet browser 240), personalize the content and/or display of the secure Internet browser 240 based on the user profile corresponding to the user, and/or the like. In an example embodiment, the user may also be logged onto and/or authenticated on the secure computing device 200, for example, via an operating system of the secure computing device 200.

In various embodiments, the logging on and/or authentication of the user and the subsequent triggering to launch an interactive user interface of the secure Internet browser 240, establish of the secure session, personalize the secure Internet browser 240, and/or the like is, in various embodiments, responsive to the detection of a known user computing device 30. As used herein, a known user computing device 30 is a user computing device 30 that has been paired with the secure computing device 200 and/or with the user profile corresponding to the user. In an example embodiment, the pairing may correspond to a particular one or more SRC protocols and/or to any SRC protocol through which both the user computing device 30 and the secure computing device 200 are configured to communicate. In various embodiments, the SRC protocols through which a user computing device 30 and/or secure computing device 200 are configured to communicate is dependent on the hardware and/or software configurations thereof.

FIG. 6 provides a data flow diagram of steps, processes, procedures, and/or operations of logging on and/or authenticating a user using proximity-based authentication techniques. The steps, processes, procedures, and/or operations shown in FIG. 6 begin after the installation and activation of the secure Internet browser 240 on the secure computing device 200, the generation of a user profile corresponding to the user 3, and the pairing of the user computing device 30 with the secure computing device 200 and/or the user profile corresponding to the user 3. Starting at operation/step 602, the secure computing device 200 initiates polling for known user computing devices 30. For example, the secure Internet browser 240 may access one or more SRC interface 225 APIs to instruct the SRC interface 225 to poll for known user computing devices 30. As should be understood the communication described herein between the SRC interface 225 and the secure Internet browser 240 is facilitated by the one or more secure interface APIs of the extension APIs 259. In an example embodiment, the SRC interface 225 may be instructed to poll periodically at a predetermined frequency. For example, the SRC interface 225 may poll every tenth of a second, half a second, second, second and a half, two seconds, and/or the like. For example, the SRC interface 225 may act as a Bluetooth listener and/or listener via one or more SRC protocols. In an example embodiment, the secure Internet browser 240 may instruct the SRC interface 225 to periodically poll for known user computing devices 30 at any time the secure computing device 200 is powered on, during particular times of day and/or days of the week (e.g., 8 am to 6 pm Monday through Friday), and/or the like. In an example embodiment, the SRC interface 225 may periodically poll for known user computing devices 30 even if the secure computing device 200 is locked and/or does not have a user currently logged on and/or authenticated thereon and/or if the secure Internet browser 240 has not been launched.

At operation/step 604, a user 3 carrying a known (previously paired) user computing device 30 and/or having the known user computing device 30 with him or her, enters within an authentication distance or range of the secure computing device 200. For example, the authentication distance may be a configurable authentication distance. In an example embodiment, the authentication distance may be configured to extend one to ten feet from the secure computing device 200. In an example embodiment, the authentication distance be configured to extend five to ten feet from the secure computing device 200.

At operation/step 606, the known user computing device 30 broadcasts an SRC signal. For example, the known user computing device 30 may be configured and/or programmed to emit, transmit, and/or broadcast one or more SRC signals periodically, and/or the like.

The SRC interface 225 receives the SRC signal broadcasted by the known user computing device 30. As the known user computing device 30 is already paired to the secure computing device 200 (and/or the secure computing device 200 has access to pairing information/data for the known user computing device 30 via the authentication server 40 and/or content server 50, for example, via the user profile stored in a user profile database 58), the secure computing device 200 recognizes the presence of the known user computing device 30 based on the received SRC signal. For example, the SRC signal may comprise the device identifier identifying the known user computing device 30. Responsive to the secure computing device 200 (e.g., via the SRC interface 225) recognizing the presence of the known user computing device 30, the SRC interface 225 may pass the device identifier to the secure Internet browser 240 indicating a known user computing device 30 has been found and/or detected, at operation/step 608.

At operation/step 610, if the SRC interface 225 and the known user computing device 30 have not already opened a connection between the known user computing device 30 and the secure computing device 200, the secure Internet browser 240 instructs the SRC interface 225 to initiate a connection between the known user computing device 30 and the secure computing device 200. At operation/step 612, the SRC interface 225 transmits and/or provides a connection request to the known user computing device 30. The known user computing device 30 then receives and processes the connection request. At operation/step 614, the known user computing device transmits, provides, and/or returns a response to the connection request and the SRC interface 225 receives the response. The SRC interface 225 may then provide and/or pass the response and/or provide a return to the secure Internet browser 240.

Responsive to determining and/or receiving a response and/or return indicating that a connection between the known user computing device 30 and the secure computing device 200 (e.g., via the SRC interface 225) has been established (e.g., using one or more SRC protocols), the secure Internet browser 240 may instruct the SRC interface 225 to halt and/or stop polling and/or listening for known user computing devices 30, at operation/step 618. The SRC interface 225 and/or secure Internet browser 240 may receive and process signals from the connected known user computing device 30 to ensure the known user computing device 30 is still in the configurable proximity of the secure computing device 200 and/or to determine when the known user computing device 30 is no longer proximate the secure computing device 200.

At operation/step 620, the secure Internet browser 240 provides and/or passes an open socket request to the SRC interface 225 (e.g., via one or more SRC interface APIs). For example, the open socket request may be a request to establish a socket connection with the known user computing device 30 via the SRC protocol. At operation/step 622, the SRC interface provides and/or transmits an open socket request to the known user computing device 30 on behalf of the secure Internet browser 240. The known user computing device 30 receives and processes the open socket request, and responsive thereto, provides, transmits, and/or broadcasts a response initiating the open socket connection, at operation/step 624. The SRC interface 225 receives the response, establishes the open socket connection, and/or provides and/or passes the response and/or an indication thereof to the secure Internet browser 240, at operation/step 626. Thus, a socket connection may be established directly between the known user computing device 30 and the secure Internet browser 240.

At operation/step 628, the secure Internet browser 240 polls the connected known user computing device 30 over the established direct socket connection to determine an SRC signal strength of the connected known user computing device 30. The connected known user computing device 30 may receive and process the poll to provide a measure of the SRC signal strength response to the secure Internet browser 240 at operation/step 632. For example, the secure Internet browser 240 may receive (e.g., via the established direct socket connection) a signal from the connected known user computing device 30. The received signal may be described and/or define a signal strength. The secure Internet browser 240 may then determine if the received SRC signal strength satisfies a predetermined first signal strength threshold. For example, it may be determined if the received SRC signal strength is approximately equal to and/or exceeds the predetermined first signal strength threshold. In an example embodiment, a single received SRC signal strength from the connected known user computing device 30 that satisfies the first signal strength threshold may trigger the authentication of the user, in an example embodiment. In another embodiment, at least a first threshold number of received SRC signal strengths provided and/or transmitted by the connected known user computing device 30 that each have a value that satisfies a first signal strength threshold are detected and/or received before the authentication of the user is triggered. In an example embodiment, the first signal strength threshold may correspond to the authentication distance and/or may be configurable based on the application.

In an example embodiment, the first threshold number of received SRC signal strengths received from the connected known user computing device 30 that each have a value that satisfies the first threshold requirement are received within a rolling time window/period of a predefined time span. For example, the rolling time window/period may be five, ten, fifteen, twenty, or thirty seconds wide or one or two minutes wide. For example, the secure Internet browser 240 may periodically poll the signal strength of the connected known user computing device (e.g., 628-632 may be performed periodically). For example, once every tenth of a second, every half a second, every second, every other second, and/or the like the secure Internet browser 240 may poll the signal strength of the connected known user computing device 30. If at least a first threshold number of the received SRC signal strengths provided at operation/step 632 satisfy the first signal strength threshold during a rolling time window/period, the authentication of the user may be triggered. In an example embodiment, the first threshold number of the received SRC signal strengths may correspond to a percentage, e.g., at least fifty percent, at least seventy-five percent, at least eighty percent, at least eighty-five percent, at least ninety percent, at least ninety-five percent and/or the like, of the SRC signal strengths received by the secure Internet browser 240 during the rolling time window/period that satisfy the first signal strength threshold. For example, at operation/step 632 the user computing device 30 may provide and/or pass a measure of the SRC signal strength response to the secure Internet browser 240. The secure Internet browser 240 may then monitor the number of received SRC signal strengths received from the connected known user computing device 30 within the rolling time window/period to determine if a first threshold number of the received SRC signal strengths each have a value that satisfies the first signal strength threshold. Responsive to determining that, during the rolling time window/period, at least the first threshold number of received SRC signal strengths from the connected known user computing device 30 each have a value that satisfies the first signal strength threshold, the authentication of the user may be triggered and the process continues to operation/step 636.

At operation/step 636, the secure Internet browser 240 may send an authentication request to an authentication server 40. For example, the secure Internet browser 240 may cause the network interface 220 to provide and/or transmit an authentication request. In an example embodiment, the authentication request comprises one or more authentication credentials. In an example embodiment, the one or more authentication credentials may define one or more authentication requirements. For example, the authentication credentials may encode a user's fingerprint and may define the authentication requirement that the user provide a fingerprint (e.g., via an input device of the user computing device 30) that matches the encoded user fingerprint within a predefined threshold accuracy. In an example embodiment, the authentication request is provided via the network 135. The authentication request may further comprise the device identifier identifying the connected known user computing device 30, an event identifier, and/or the like.

In an example embodiment, a program and/or application operating on the authentication server 40 and/or a third party computing device may be configured to authenticate a user corresponding to the connected user computing device 30. In an example embodiment, functions described herein as being performed by the authentication server 40 may be performed by and/or via a cloud-based service. As will be recognized, the cloud may be a computer network that provides shared computer processing resources and/or data to computing devices and other devices connected thereto (e.g., via network 135). The authentication server 40 may receive and process the authentication request and, responsive thereto transmit a push notification or the like to the connected known user computing device 30. For example, the push notification may be transmitted to the connected known user computing device 30 via the network 135. The connected known user computing device 30 may receive and process the push notification, and responsive thereto, user may respond and be prompted to provide authentication input via the user input interface of the connected user computing device 30 at step/operation 640 (keypad 318, a digital image capture device, and/or the like). For example, the user may be prompted (e.g., via an output device such as a speaker and/or display 316 of the user computing device 30) to enter biometric data (e.g., the connected user computing device 30 may attempt to capture a fingerprint of the user 3, a face and/or iris scan of the user 3, and/or the like), unlock the connected known user computing device 30, enter a passkey via the keypad 318 and/or other input device of the connected known user computing device 30, perform a gesture, and/or the like. In various embodiments, the prompted authentication input is intended to ensure that the user 3 carrying and/or having the connected known user computing device 30 is the user 3 corresponding to the user profile associated with the connected known user computing device 30.

The user 3 may provide authentication input responsive to the prompt at step/operation 642. For example, the user 3 may provide authentication input via the keypad 318, a touch screen, image capture device, and/or other input device of the connected user computing device 30 in response to the prompt. Responsive to receiving the user input, the connected known user computing device 30 may process the user input to determine if the input satisfies one or more user authentication requirements. As should be understood the authentication requirements may correspond to a biometric authentication of the user 3, the entering of a passkey via the connected known user computing device 30, and/or other input configured to confirm that the user 3 is the user corresponding to the user profile to which the connected known user computing device 30 is associated.

Responsive to the user 3 providing authentication input that satisfies the authentication requirements, the connected known user computing device 30 returns an authentication response to the authentication server 40 indicating and/or confirming that the user has been authenticated, at step/operation 644. For example, the authentication response may be received by the authentication server 40 via the network 135. In an example embodiment, the authentication response comprises a unique authentication event identifier. Responsive to receiving and processing the authentication response, the authentication server 40 may provide a successful authentication response to the secure Internet browser 240 at step/operation 646 indicating the authentication confirmation and/or the confirming that the user 3 has been authenticated via the user computing device 30. In an example embodiment, the authentication server 40 generates a session identifier and provides the session identifier in the authentication confirmation. In an example embodiment, the session identifier is configured to identify a secure session established for the user 3 via the secure Internet browser 240. For example, the authentication server 40 may provide the successful authentication response via the network 135. The secure Internet browser 240 may receive the successful authentication response via the network interface 220. Responsive to receiving and/or processing the successful authentication response, the secure Internet browser 240 may authorize the user 3, establish a secure session with the authentication server 40 and/or content server 50 via the secure Internet browser 240, and/or personalize a presentation (e.g., landing page) for the user.

In an example embodiment, a soft token corresponding to the user's 3 user profile and/or passkey for decrypting a soft token corresponding to the user's 3 user profile may be stored by the user computing device 30 and the connected known user computing device 30 automatically provides the soft token and/or passkey to the secure computing device 200 (e.g., the secure Internet browser 240) in response to the authentication input satisfying the authentication requirements. Upon receiving the soft token and/or the passkey, the secure Internet browser 240 may decrypt a soft token stored by the secure computing device 200 using the passkey, pass the soft token to the authentication server 40, and/or the like to authorize the user 3 and initiate a secure session with the authentication server 40 via the secure Internet browser 240. For example, the secure Internet browser 240 may cause the user to be logged in and/or authenticated with the operating system of the secure computing device 200 in addition to authenticating and/or logging the user into the secure Internet browser 240 and establishing a secure session via the secure Internet browser 240 with the authentication server 40.

At 648, in response to receiving and/or processing the successful authentication response, the secure Internet browser 240 provides the user 3 with access to a controlled-access application or content by, for example, transmitting, by the secure Internet browser to the authentication server 40 (and/or a content server 50), a request for a web page of the controlled-access application or content, and displaying, by the secure Internet browser 240, the web page. For example, the secure computing device 200 may establish a secure session with the authentication server 40 via the secure Internet browser 240. As will be recognized, the secure Internet browser 240 may provide, transmit, and/or the like, log on and/or authentication information/data for the user 3 and/or corresponding to the user profile associated with the connected known user computing device 30 to the authentication server 40 and/or content server 50. In an example embodiment, the secure Internet browser 240 may provide, transmit, and/or the like the session identifier to the authentication server 40 and/or content server 50. The secure Internet browser 240 may also provide a soft token, passkey, and/or the like to the authentication server 40 to log in and/or authenticate the user 3 corresponding to the user profile associated with the connected known user computing device 30 and to establish a secure session with the authentication server 40. In an example embodiment, the establishment of the secure session comprises logging into one or more accounts corresponding to the user profile information/data via the secure sever 40 and/or one or more content servers 50, receiving at least a portion of the user profile at the secure Internet browser 240 operating on the secure computing device 200, and/or the like.

In an example embodiment, in response to receiving and/or processing the log in request provided by the secure computing device 200 at step/operation 648, the authentication server 40 may provide a personalized configuration corresponding to and/or based on the authorized user profile. The secure Internet browser 240 may then receive the personalized configuration. In an example embodiment, the processing of the personalized configuration by the secure Internet browser 240 causes a particular set of tiles, links, and/or the like to be displayed via a landing page displayed in a user interface of the secure Internet browser 240 via an output device of the user interface 230. For example, the personalized configuration may comprise the information/data for the secure Internet browser 240 to provide the user 3 with a virtual machine via the user interface of the secure Internet browser 240.

FIG. 6A illustrates provides a data flow diagram of steps, processes, procedures, and/or operations of logging on and/or authenticating a user using proximity-based authentication techniques similar to that shown in FIG. 6. In particular, FIG. 6A is similar to FIG. 6 through step/operation 632. However, according to FIG. 6A, responsive to determining that the value of at least one received SRC signal strength satisfies the first signal strength or that, during the rolling time window/period, at least the first threshold number of received SRC signal strengths from the connected known user computing device 30 each have a value that satisfies the first signal strength threshold, the authentication of the user may be triggered and the process continues to operation/step 650. At operation/step 650, the secure computing device 200 provides or transmits a push notification or other notification comprising a user authentication request to the user computing device 30. In an example embodiment, the user authentication request comprises one or more authentication credentials. In an example embodiment, the one or more authentication credentials may define one or more authentication requirements. For example, the authentication credentials may encode a user's fingerprint and may define the authentication requirement that the user provide a fingerprint (e.g., via an input device of the user computing device 30) that matches the encoded user fingerprint within a predefined threshold accuracy. In an example embodiment, the push notification or other notification is provided via the network 135. In another example embodiment, the notification is provided and/or transmitted from the secure Internet browser 240 to the user computing device 30 via the socket connection.

The user computing device 30 receives and process the user authentication request, and responsive thereto, the user 3 may be prompted to provide authentication input via the user input interface of the connected user computing device 30 at step/operation 652. For example, the user 3 may provide authentication input via keypad 318, a digital image capture device, and/or the like. The user 3 may be prompted (e.g., via an output device such as a speaker and/or display 316 of the user computing device 30) to enter biometric data (e.g., the connected user computing device 30 may attempt to capture a fingerprint of the user 3, a face and/or iris scan of the user 3, and/or the like), unlock the connected known user computing device 30, enter a passkey via the keypad 318 and/or other input device of the connected known user computing device 30, perform a gesture, and/or the like. In various embodiments, the prompted authentication input is intended to ensure that the user 3 carrying and/or having the connected known user computing device 30 is the user 3 corresponding to the user profile associated with the connected known user computing device 30.

The user 3 may provide authentication input responsive to the prompt at step/operation 654. For example, the user 3 may provide authentication input via the keypad 318, a touch screen, image capture device, and/or other input device of the connected user computing device 30 in response to the prompt. Responsive to receiving the user input, the connected known user computing device 30 may process the user input to determine if the input satisfies one or more user authentication requirements. As should be understood, the authentication requirements may correspond to a biometric authentication of the user 3, the entering of a passkey via the connected known user computing device 30, and/or other input configured to confirm that the user 3 is the user corresponding to the user profile to which the connected known user computing device 30 is associated.

Responsive to the user 3 providing authentication input that satisfies the authentication requirements, the connected known user computing device 30 returns an authentication response to the secure Internet browser 240 (e.g., via network 135 and/or the socket connection) indicating and/or confirming that the user has been authenticated, at step/operation 656. In an example embodiment, the authentication response comprises an authentication credential. For example, the user computing device 30 may provide, transmit, and/or the like an authentication credential (e.g., that is stored in memory 322, 324) to the secure computing device 200 via the socket connection and/or network 135. In an example embodiment, the authentication credential may be specific to the authentication provider (e.g., the program and/or application of the authentication server 40 configured and/or programmed to perform the user authentication). In an example embodiment, the authentication credential is provided, passed, and/or transmitted to the secure computing device 200 by the user computing device 30 responsive to the user providing input to the user computing device 30 to authenticate the user of the user computing device 30.

Responsive to receiving and processing the authentication response, the secure Internet browser 240 may provide and/or transmit an authentication request to the authentication server 40 at operation/step 658. In an example embodiment, the authentication request comprises the authentication credential provided by the user computing device 30. In an example embodiment, the authentication request may indicate that the user 3 has been successfully authenticated and request that the secure session be initiated. Responsive to receiving and processing the authentication request comprising the authorization credential, the authentication server 40 may provide a successful authentication response to the secure Internet browser 240 at step/operation 660 indicating the authentication confirmation—confirming that the user 3 has been authenticated via the user computing device 30 and/or initiating and/or establishing the secure session. For example, the authentication server 40 may provide the successful authentication response via the network 135. The secure Internet browser 240 may receive the successful authentication response via the network interface 220. Responsive to receiving and/or processing the successful authentication response, the secure Internet browser 240 may authorize the user 3, establish a secure session with content server 50 via the secure Internet browser 240, and/or personalize a presentation (e.g., landing page) for the user.

At 662, in response to receiving and/or processing the successful authentication response, the secure Internet browser 240 provides the user 3 with access to a controlled-access application or content by, for example, transmitting, by the secure Internet browser to the authentication server 40 (and/or a content server 50), a request for a web page of the controlled-access application or content, and displaying, by the secure Internet browser 240, the web page. For example, the secure computing device 200 may establish a secure session with the authentication server 40 and/or content server 50 via the secure Internet browser 240. As will be recognized, the secure Internet browser 240 may provide, transmit, and/or the like, log on and/or authentication information/data for the user 3 and/or corresponding to the user profile associated with the connected known user computing device 30 to the authentication server 40 and/or content server 50. The secure Internet browser 240 may also provide a soft token, passkey, and/or the like to the authentication server 40 and/or content server 50 to log in and/or authenticate the user 3 corresponding to the user profile associated with the connected known user computing device 30 and to establish a secure session with the authentication server 40 and/or content server 50. In an example embodiment, the establishment of the secure session comprises logging into one or more accounts corresponding to the user profile information/data via the secure sever 40 and/or one or more content servers 50, receiving at least a portion of the user profile at the secure Internet browser 240 operating on the secure computing device 200, and/or the like.

In an example embodiment, in response to receiving and/or processing the log in request provided by the secure computing device 200 at step/operation 662, the authentication server 40 may provide a personalized configuration corresponding to and/or based on the authorized user profile. The secure Internet browser 240 may then receive the personalized configuration. In an example embodiment, the processing of the personalized configuration by the secure Internet browser 240 causes a particular set of tiles, links, and/or the like to be displayed via a landing page displayed in a user interface of the secure Internet browser 240 via an output device of the user interface 230. For example, the personalized configuration may comprise the information/ data for the secure Internet browser 240 to provide the user 3 with a virtual machine via the user interface of the secure Internet browser 240.

In various embodiments, responsive to the logging in and/or authenticating of the user 3 and the establishment of the secure session with the authentication server 40 and/or content server 50, a user interface of the secure Internet browser 240 is launched and provides a personalized landing page 700, an example of which is shown in FIG. 7. The landing page 700 is an example of a web page of a controlled-access application that may be displayed via an output device of the user interface 230 of the secure computing device 200, in an example embodiment. In an example embodiment, the secure Internet browser 240 may already be operating and/or running on the secure computing device 200 and the secure Internet browser 240 may display and/or provide the personalized landing page 700. For example, the personalized landing page 700 is displayed and/or provided via a display, monitor, and/or other visual output device and/or element of the user interface 230. For example, the personalized landing page 700 may be personalized based on user profile information/data of the user profile corresponding to the user 3 and/or associated with the connected known user computing device 30. For example, the secure Internet browser 240 may receive at least a portion of a user profile corresponding to the user 3, such as a personalized configuration, responsive to the secure Internet browser 240 providing and/or transmitting the log on and/or authentication information/data for the user 3 and/or corresponding to the user profile associated with the connected known user computing device 30 to the authentication server 40 and/or content server 50.

In an example embodiment, the personalized landing page 700 may comprise one or more user-selectable links, icons, graphics, tiles, tabs, frames, windows, and/or the like 710 (e.g., 710A-H). Each "tile" may be a visual element on the personalized landing page 700 that when selected, clicked, and/or the like via user interaction with an input device of the user interface 230 causes the secure Internet browser 240 to access a link corresponding to the tile; access and provide a web page corresponding to the tile; launch, access, and/or provide a user interface of an application and/or program corresponding to the tile, and/or the like via a user interface of the secure Internet browser 240. In an example embodiment, the personalized landing page 700 may include a URL field that may display the URL of content currently being viewed or that a user may be able to enter a URL and, if the URL is an allowed URL for the user (e.g., based on the corresponding user profile), the content and/or function corresponding to the URL will be subsequently provided via the interactive user interface of the secure Internet browser 240. As should be understood, the personalized landing page 700 may provide access to the controlled-access functions and/or content corresponding to the user profile corresponding to the authenticated user in a variety of manners. The illustrated personalized landing page 700 is provided as a non-limiting example.

In an example embodiment, the personalized landing page 700 may further comprise a security seal 702 indicating that personalized landing page 700 is being provided via a secure session. In various embodiments, each website, application, and/or program accessed via the personalized landing page 700 may also include a security seal 702 to show that the website, application, and/or program is being provided via the secure session. In an example embodiment, the authentication server 40 and/or secure Internet browser 240 may modify a website and/or user interface of a program and/or application prior to displaying the website and/or user interface via the secure Internet browser 240 to add the security seal to the website and/or user interface. For example, the secure Internet browser 240 may confirm that the web page, program, and/or application is being provided by an appropriate entity/device corresponding to the web page, program, and/or application, and may then adjust the display of the web page, program, and/or application, as provided by the secure Internet browser 240, to add the security seal 702 to the display of the web page, program, and/or application via the output device of the user interface 230. For example, if the web page is an online banking portal for Wells Fargo, the secure Internet browser 240 may confirm that the web page is being provided by a content server 50 that is authorized by Wells Fargo. Thus, the user 3 may be ensured that the website and/or program and/or application being accessed via the secure Internet browser 240 is being provided via secure session with the authentication server 40.

d. Exemplary Locking of a Secure Session

In an example embodiment, a secure session of the secure Internet browser 240 with the authentication server 40 may be terminated and/or locked based on the connected known user computing device 30 leaving the vicinity of the secure computing device 200. FIG. 8 provides a control flow diagram illustrating processes, procedures, and/or operations that may be used to lock a secure session of a secure Internet browser 240 and/or log an authenticated user out of a secure session of the secure Internet browser 240 and/or logging the user out of an operating system of the secure computing device 200.

Starting at 802, the secure Internet browser 240 periodically polls the signal strength of the connected known computing device 30. For example, the secure Internet browser 240 may be providing a user 3 with a secure session via the secure Internet browser 240 and the authentication server 40 and/or one or more content servers 50. During the secure session, the secure Internet browser 240 may be configured to periodically poll the signal strength of a return SRC signal emitted, transmitted, provided, and/or the like by the connected known computing device 30. The connected known computing device 30 may receive and process the signal strength poll, and responsive thereto, provide a return SRC signal. For example, the connected known computing device 30 may provide a return SRC signal at 808. The return SRC signal may provide a measurement and/or indication of the SRC signal strength.

While the user 3 and the connected known user computing device 30 remain within a configurable lock distance of the secure computing device 200, the measurement and/or indication of the SRC signal strength of the return SRC signal is expected to satisfy a second signal strength threshold. In an example embodiment, the second signal strength threshold corresponds to a lock distance or range. For example, the lock distance or range may be a configurable lock distance may be equal to or greater than the authentication distance. In an example embodiment, the second signal strength threshold may correspond to the configurable lock distance and/or may be configurable based on the application. In an example embodiment, the configurable lock distance is larger than the authentication distance. In an example embodiment, the configurable lock distance extends five to twenty feet from the secure computing device 200. In an example embodiment, the configurable lock distance extends ten to thirty feet from the secure computing device 200.

At step/operation 806, the user 3 and the connected known user computing device 30 move out of the configurable lock distance and the measurement and/or indication of the SRC signal strength of the return SRC signal fails to satisfy the second signal strength threshold. In an example embodiment, a single received measurement and/or indication of the SRC signal strength from the connected known user computing device 30 that fails to satisfy the second signal strength threshold may trigger the locking of the secure Internet browser 240 and/or the corresponding secure session. In an example embodiment, the locking of the secure Internet browser 240 may lock the secure Internet browser 240 from receiving user input (e.g., via an input device of the user interface 230 of the secure computing device 200), prevent an output device of user interface 230 of the secure computing device 200 from displaying and/or providing the window of the secure Internet browser 240 that was being used by the user 3, and/or the like, until the user re-authenticates (either explicitly on the user computing device or by the associated user computing device once again entering the authentication distance or range and the proximity-based authentication process of FIG. 6 or FIG. 6A being performed). In an example embodiment, at least a second threshold number of measurements and/or indications of the SRC signal strength provided and/or transmitted by the connected known user computing device 30 that each have a value that fails to satisfy the second signal strength threshold are detected and/or received before the secure Internet browser 240 and/or secure session are locked. In an example embodiment, the second threshold number of measurements and/or indications of the SRC signal strength received from the connected known user computing device 30 that each have a value that fails to satisfy the second threshold requirement are received within a rolling time window/period of a predefined time span. For example, the rolling time window/period may be five, ten, fifteen, twenty, or thirty seconds wide or one, two, or five minutes wide. For example, as noted above, the secure Internet browser 240 may periodically poll the signal strength of the connected known user computing device (e.g., 802 and 808 may be performed periodically). For example, once every tenth of a second, every half a second, every second, every other second, and/or the like the secure Internet browser 240 may poll the signal strength of the connected known user computing device 30. If at least a second threshold number of the measurements and/or indications of the SRC signal strength provided at step/operation 808 fail to satisfy the second signal strength threshold during a rolling time window/period, the locking of the secure session and/or secure Internet browser 240 may be triggered. In an example embodiment, the second threshold number of responses may correspond to at least fifty percent, at least seventy-five percent, at least eighty percent, at least eighty-five percent, at least ninety percent, at least ninety-five percent and/or the like of the measurements and/or indications of the SRC signal strength during the rolling time window/period that fail satisfy the second signal strength threshold. For example, at 808 the user computing device 30 may provide and/or pass a measurement and/or indication of the SRC signal strength broadcasted, transmitted, and/or provided by the known user computing device 30 to the secure Internet browser 240. The secure Internet browser 240 may then monitor the number of measurements and/or indications of the SRC signal strength received from the connected known user computing device 30 within the rolling time window/period to determine if a second threshold number of measurements and/or indications of the SRC signal strength each have a value that fails to satisfy the second signal strength threshold. Responsive to determining that, during the rolling time window/period, at least the second threshold number of measurements and/or indications of the SRC signal strength received from the connected known user computing device 30 each have a value that fails to satisfy the second signal strength threshold, the secure Internet browser and/or secure session may be locked.

For example, at 812, the secure Internet browser 240 may cause the network interface 220 to provide a message indicating that the secure session is to be locked and/or indicating that the secure Internet browser 240 operating on the secure computing device 200 has been locked. In various embodiments, if the connected known user computing device 30 becomes disconnected from the secure computing device 200 (e.g., the user 3 and the user computing device 30 move outside of the range of the SRC protocol), the secure Internet browser 240 may log the user out of the secure Internet browser 240, close the secure session, log the user 3 out of the operating system of the secure computing device 200, and/or the like, in an example embodiment. In an example embodiment, if the secure Internet browser 240 and/or secure session remains locked for a predetermined amount of time (e.g., five minutes, ten minutes, twenty minutes, and/or the like), the secure Internet browser 240 may log the user out of the secure Internet browser 240, close the secure session, log the user out of the operating system of the secure computing device 200, and/or the like.

e. Example Use Cases

In an example embodiment, the secure computing device 200 is a user's 3 work or personal computer, such as a desktop, laptop, tablet, and/or the like and the user computing device 30 may be the user's mobile device, such as a smartphone, wearable device, tablet, and/or the like. The secure Internet browser 240 may be installed and activated on the secure computing device 200 and the user computing device 30 may be paired with the secure computing device 200 and/or the user's 3 user profile. For example, the user 3 may use the secure computing device 200 to access one or more controlled-access applications and/or content. In various embodiments, the one or more controlled-access applications and/or content may comprise and/or be provided to the user as one or more web pages. The secure computing device 200 may be configured to allow one or a plurality of user's 3 access various controlled-access applications and/or content via the secure computing device 200. For example, the controlled-access applications provided (e.g., via a landing page 700) to a first user (e.g., based on a first user profile corresponding to the first user) may be different from the controlled-access applications provided to a second user (e.g., based on a second user profile corresponding to the second user). Moreover, the secure Internet browser 240 may be configured to (a) log the first user into first user accounts corresponding to the controlled-access applications provided to the first user and (b) log the second user into second user accounts (i) that are different from the first user accounts and (ii) that correspond to the controlled-access applications provided to the second user.

In an example embodiment, the secure computing device 200 is a kiosk and/or other computing device for public use. For example, the secure computing device 200 may be an ATM, an automated and/or self-check-out system and/or other point-of-service (POS) system at a retailer, airline check-in kiosk, digital library card catalog, and/or the like. For example, the user 3 carrying and/or having with her/him a user computing device 30 that has been paired with the kiosk and/or the user's 3 user profile. The secure Internet browser 240 operating on the kiosk may identify and/or authenticate the user based on the user computing device 30, user interaction with the user computing device 30 (e.g., to provide the authentication input), and/or an ATM/debit/credit card inserted into a card reader of the kiosk or another instrument (e.g., a soft version of the card stored in a digital wallet on the user computing device 30, and/or the like). In an example embodiment, the proximity-based authentication performed using the user computing device 30 within the authentication distance of the kiosk may be used to authenticate the user in place of a PIN, ATM/debit/credit card, and/or the like. Once the user is authenticated based at least in part on the detection of the user computing device 30 within the authorization distance of the kiosk, the user 3 may be able to interact with the user interface 230 of the kiosk to access a web page of a controlled-access application. Via one or more web pages of the controlled-access application, the user 3 may be able to check an account balance; deposit one or more checks and/or cash; transfer funds; request a cash withdrawal; pay for services and/or products; check in for one or more flights; retrieve information corresponding to one or more user accounts, travel or meeting agendas, one or more flights; access a library card catalog; and/or the like. In another example, the kiosk is a POS system and the POS system may access a user's loyalty account corresponding to the retailer via the secure session provide by the secure Internet browser using the proximity-based authentication described herein.

In an example embodiment, the secure computing device 200 may be operated by a service provider (e.g., an employee and/or associate of an organization, institution, and/or the like) at a service station. For example, the secure computing device 200 may be operated by a bank teller and the service station may be a bank teller station. In another example embodiment, the secure computing device 200 may be operated by a flight or gate attendant and the service station may be an airport service desk and/or gate computer terminal. When the user 3 approaches the service station, the secure computing device 200 identifies the user computing device 30 (e.g., the user's smart watch) within the authorization distance of the secure computing device 200. The secure Internet browser 240 operating on the secure computing device 200 may authorize the user 3 and provide the bank teller with a web page of a controlled-access application that provides the service provider with information/data corresponding to one or more accounts, flights, travel agendas, and/or the like corresponding to the user 3 and allow the service provider to perform one or more functions corresponding to the one or more accounts, flights, travel agendas, and/or the like corresponding to the user 3. For example, the web page may provide the service provider (e.g., bank teller) with balance information and/or provide the user with a function for depositing one or more checks, making a cash withdrawal, and/or the like corresponding to one or more corresponding to the user 3 and the bank. In another example, the web page may provide the service provider (e.g., gate attendant) with information regarding a connecting flight, rescheduling a missed connecting flight, and/or the like in accordance with a travel agenda for the user.

In another example embodiment, the secure computing device 200 is a work station at an education/learning center. In an example embodiment, an education/learning center may be a school, a tutoring center, a testing center, and/or the like. In an example embodiment, a user may access a secure session to view a user-specific presentation of curriculum, class materials, lab content, and/or the like. A user may complete one or more worksheets, lab write-ups, and/or other work products provided via the secure Internet browser. The secure Internet browser may bookmark where a user left off in a presentation or worksheet, etc. such that when the user next access the secure Internet browser (on the same or on a different secure computing device 200) the user may return to where they left off.

In another example, the secure computing devices 200 may be workstations (e.g., a plurality of workstations) that may be used (e.g., successively) by a plurality of employees. The different employees may each have different permissions regarding content they are allowed to access, functions they are allowed to perform, and/or the like. A user may approach one of the workstations, be logged in to a secure session via the workstation (e.g., based on the authentication of the user via the user computing device 30 and the proximity of the user computing device 30 to the workstation), perform one or more work tasks, and then leave the proximity of the workstation to cause the secure session to be ended and to make the workstation available for use by another employee. Some example contexts for such example embodiments may include commercial banking, a bank branch (e.g., wherein the employees may be tellers, private bankers, loan officers, and/or a combination thereof), a medical clinic or hospital (e.g., wherein the employees may be physicians, physician assistants, nurse practitioners, registered nurses, technicians, various technology specialists, support staff, social workers, and/or a combination thereof), a library (e.g., wherein the employees are librarians and/or other library staff), and customer care environments (e.g., car sales people, showroom sales people, and/or the like).

In another example, the secure computing device 200 may be a physical security control panel, an HVAC control panel, and/or other systems control panel. Authenticating a user via a known user computing device 30 located within the authentication distance or range of the control panel may allow the user to access certain access-controlled features of the security system, HVAC system, and/or the like. For example, in the case of a security system, a user with the appropriate permissions may be given access to an interactive user interface via the secure Internet browser that allows the user to change the alarm code, and/or the like.

In another example embodiment, the secure computing device 200 may be a vehicle infotainment system that may authenticate a user as a driver and/or passenger of the vehicle based on the proximity of the user's user computing device 30 to the infotainment system and/or location within the vehicle. For example, the vehicle infotainment system may provide routing information/data to common destinations of the user, set the vehicle HVAC based on user preferences, generate and provide a user-specific presentation of station preferences (e.g., radio station preferences), generate and provide a user-specific presentation of vehicle information/data, and/or the like.

As should be understood, these example scenarios are provided as non-limiting examples of applications of various embodiments of the present invention.

f. Technical Advantages

Various embodiments provide technical solutions to technical problems arising in the field of secure Internet browsing and user authentication. For example, various embodiments address the technical problem of improving user authentication and providing improved security for providing access to access-controlled functions and/or content. For example, based on the proximity of a known user computing device 30 that is associated with a user profile to secure computing device 200, a user interface of a secure Internet browser 240 operating on the secure computing device 200 may be launched, the user may be authenticated therewith, and secure session with an authentication server may be initiated to provide the user with access to one or more web pages of one or more controlled-access applications. The proximity of the user computing device to the secure computing device 200 is performed via communication performed via an SRC protocol. Moreover, as the secure Internet browser 240 is configured to authenticate the user for providing access to one or more controlled-access applications such that the user need not enter a passkey corresponding to the controlled-access application, the user need not remember the controlled-access application specific passkey. Thus, in various embodiments, the authentication server 40 may periodically change the log in credentials for the user for a controlled-access application. For example, once a week, once a month, and/or the like, the authentication server 40 may update the log in credentials for at least one of the controlled-access applications to a thirty character string, and/or the like. Thus, the user can experience greater security of the user's accounts with the controlled-access application without having to remember the passkey and/or log in credentials for the user's account with the controlled-access application or without having to remember to regularly change the passkey and/or log in credentials.

Additionally, various embodiments further provide a technical solution for automatically locking a secure Internet browser and/or secure session in response to a user leaving the vicinity of the secure computing device 200, without explicit action by the user. Thus, various embodiments provide improved control of access to access-controlled functions and/or content accessed via a secure Internet browser. Various embodiments are therefore necessarily grounded in computer technology and solve a problem in the realm of providing secure computer communications and interactions.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing access to a controlled-access application accessible by a secure Internet browser, the method comprising:
responsive to determining that a second computing device is within an authentication distance of a first computing device based at least in part on a short range communication (SRC) protocol signal strength of the second computing device, transmitting, by the secure Internet browser executing on the first computing device, an authentication request to a first server, wherein the authentication request comprises (a) a device identifier of the second computing device, and (b) a user credential of a user associated with the second computing device;
responsive to transmitting the authentication request, receiving, by the secure Internet browser originating from the first server, an authentication response, wherein the authentication response (a) indicates that the second computing device has been authenticated, (b) indicates that a secure session has been initiated for the user, and (c) comprises a session identifier; and
responsive to receiving the authentication response, providing, by the secure Internet browser, access to the controlled-access application by:
transmitting, by the secure Internet browser to a second server, a request for a presentation associated with the controlled-access application, wherein the request for the presentation comprises the session identifier,
receiving, by the secure Internet browser originating from the second server, the presentation, and
directing display of, by the secure Internet browser, the presentation.

2. The method of claim 1 further comprising:
determining, by the secure Internet browser, that the second computing device is outside a lock distance from the first computing device, wherein the lock distance is the same as or greater than the authentication distance; and
responsive to determining that the second computing device is outside the lock distance from the first computing device, locking the secure Internet browser.

3. The method of claim 2, wherein the second computing device is determined to be outside the lock distance from the first computing device when a predetermined number of received measurements of SRC protocol signal strength of the second computing device is less than or equal to a predetermined threshold.

4. The method of claim 1 further comprising receiving, by the secure Internet browser from the second computing device, a passkey associated with the user, wherein (a) the user credential comprises the passkey, and (b) the passkey comprises at least one of a personal identification number (PIN), biometric data, gesture data, or a soft token.

5. The method of claim 1, further comprising receiving, by the secure Internet browser from the second computing device, the device identifier of the second computing device.

6. The method of claim 1, wherein (a) the SRC protocol comprises at least one of Bluetooth, low energy Bluetooth, Near-Field Communication (NFC), Wi-Fi, ZigBee, Z-Wave, 6LoWPAN, infrared frequency protocol, or radio frequency identification (RFID), and (b) the first server and the second server are the same server.

7. The method of claim 1, wherein the first computing device comprises at least one of a kiosk, an automated teller machine (ATM), a tablet, a laptop, a desktop, and a mobile device.

8. The method of claim 1, wherein the presentation is personalized based at least in part on a personalized configuration setting associated with the user.

9. A first computing device for providing a controlled-access application accessible by a secure Internet browser executing on the first computing device, the first computing device comprising at least one processor and at least one memory storing computer program code, the at least one memory and the computer program code configured to, with the at least one processor, cause the first computing device to at least:
responsive to determining that a second computing device is within an authentication distance of a first computing device based at least in part on a short range communication (SRC) protocol signal strength of the second computing device, transmit, by the secure Internet browser executing on the first computing device, an authentication request to a first server, wherein the authentication request comprises (a) a device identifier of the second computing device, and (b) a user credential of a user associated with the second computing device;

responsive to transmitting the authentication request, receive, by the secure Internet browser originating from the first server, an authentication response, wherein the authentication response (a) indicates that the second computing device has been authenticated, (b) indicates that a secure session has been initiated for the user, and (c) comprises a session identifier; and responsive to receiving the authentication response, provide, by the secure Internet browser, access to the controlled-access application by:

transmitting, by the secure Internet browser to a second server, a request for a presentation associated with the controlled-access application, wherein the request for the presentation comprises the session identifier, receiving, by the secure Internet browser originating from the second server, the presentation, and directing display of, by the secure Internet browser, the presentation.

10. The first computing device of claim 9, wherein the at least one memory and the computer program code are further configured to, with the at least one processor, cause the first computing device to at least:

determine, by the secure Internet browser, that the second computing device is outside a lock distance from the first computing device, wherein the lock distance is the same as or greater than the authentication distance; and responsive to determining that the second computing device is outside the lock distance from the first computing device, lock the secure Internet browser or terminate the session.

11. The first computing device of claim 10, wherein the second computing device is determined to be outside the lock distance from the first computing device when a predetermined number of received measurements of SRC protocol signal strength of the second computing device is less than or equal to a predetermined threshold.

12. The first computing device of claim 9, wherein the at least one memory and the computer program code are further configured to, with the at least one processor, cause the first computing device to at least receive, by the secure Internet browser from the second computing device, an authentication token associated with the user, wherein the authentication request comprises the authentication token.

13. The first computing device of claim 9, wherein the at least one memory and the computer program code are further configured to, with the at least one processor, cause the first computing device to at least receive, by the secure Internet browser from the second computing device, a passkey associated with the user, wherein (a) the user credential comprises the passkey, and (b) the passkey comprises at least one of a personal identification number (PIN), biometric data, gesture data, or a soft token.

14. The first computing device of claim 9, wherein (a) the SRC protocol comprises at least one of Bluetooth, low energy Bluetooth, Near-Field Communication (NFC), Wi-Fi, ZigBee, Z-Wave, 6LoWPAN, infrared frequency protocol, or radio frequency identification (RFID), and (b) the first server and the second server are the same server.

15. The first computing device of claim 9, wherein the first computing device comprises at least one of a kiosk, an automated teller machine (ATM), a tablet, a laptop, a desktop, and a mobile device.

16. The first computing device of claim 9, wherein the presentation is personalized based at least in part on a personalized configuration setting associated with the user.

17. A computer program product for providing access to a controlled-access application accessible by a secure Internet browser executing on a first computing device, the computer program product comprising at least one non-transitory computer-readable storage medium having computer-executable program code portions stored therein, the computer-executable program code portions comprising program code instructions, wherein the computer program code instructions, when executed by a processor of the first computing device, are configured to cause the first computing device to at least:

responsive to determining that a second computing device is within an authentication distance of a first computing device based at least in part on a short range communication (SRC) protocol signal strength of the second computing device, transmit, by the secure Internet browser executing on the first computing device, an authentication request to a first server, wherein the authentication request comprises (a) a device identifier of the second computing device, and (b) a user credential of a user associated with the second computing device;

responsive to transmitting the authentication request, receive, by the secure Internet browser originating from the first server, an authentication response, wherein the authentication response (a) indicates that the second computing device has been authenticated, (b) indicates that a secure session has been initiated for the user, and (c) comprises a session identifier; and responsive to receiving the authentication response, provide, by the secure Internet browser, access to the controlled-access application by:

transmitting, by the secure Internet browser to a second server, a request for a presentation associated with the controlled-access application, wherein the request for the presentation comprises the session identifier, receiving, by the secure Internet browser originating from the second server, the presentation, and directing display of, by the secure Internet browser, the presentation.

18. The computer program product of claim 17, wherein the computer program code instructions, when executed by a processor of a first computing device, are further configured to cause the first computing device to at least:

determine, by the secure Internet browser, that the second computing device is outside a lock distance from the first computing device, wherein the lock distance is the same as or greater than the authentication distance; and responsive to determining that the second computing device is outside the lock distance from the first computing device, lock the secure Internet browser.

19. The computer program product of claim 18, wherein the second computing device is determined to be outside the lock distance from the first computing device when a predetermined number of received measurements of SRC protocol signal strength of the second computing device is less than or equal to a predetermined threshold.

20. The computer program product of claim 17, wherein the at least one memory and the computer program code are further configured to, with the at least one processor, cause the first computing device to at least receive, by the secure Internet browser from the second computing device, an authentication token associated with the user, wherein the authentication request comprises the authentication token.

21. The computer program product of claim 17, wherein the at least one memory and the computer program code are further configured to, with the at least one processor, cause the first computing device to at least receive, by the secure Internet browser from the second computing device, a passkey associated with the user, wherein (a) the user credential comprises the passkey, and (b) the passkey comprises at least one of a personal identification number (PIN), biometric data, gesture data, or a soft token.

22. The computer program product of claim 17, wherein (a) the SRC protocol comprises at least one of Bluetooth, low energy Bluetooth, Near-Field Communication (NFC), Wi-Fi, ZigBee, Z-Wave, 6LoWPAN, infrared frequency protocol, or radio frequency identification (RFID), and (b) the first server and the second server are the same server.

23. The computer program product of claim 17, wherein the first computing device comprises at least one of a kiosk, an automated teller machine (ATM), a tablet, a laptop, a desktop, and a mobile device.

24. The computer program product of claim 17, wherein the presentation is personalized based at least in part on a personalized configuration setting associated with the user.

* * * * *

UNITED STATES PATENT AND TRADEMARK OFFICE
CERTIFICATE OF CORRECTION

Page 1 of 1

PATENT NO. : 10,909,268 B2
APPLICATION NO. : 16/815057
DATED : February 2, 2021
INVENTOR(S) : Graf et al.

It is certified that error appears in the above-identified patent and that said Letters Patent is hereby corrected as shown below:

On the Title Page

--(72) Inventors: Scott Graf, Decatur, GA (US); Christopher David Landry, Suwanee, GA (US); Dennis Yinhaw Wang, Pittsburgh, PA (US)--

Should read:
"(72) Inventors: Scott Graf, Decatur, GA (US); Christopher David Landry, Suwanee, GA (US); Dennis Yihhaw Wang, Pittsburgh, PA (US)"

Signed and Sealed this
Second Day of March, 2021

Drew Hirshfeld
*Performing the Functions and Duties of the
Under Secretary of Commerce for Intellectual Property and
Director of the United States Patent and Trademark Office*